US006998445B2

(12) United States Patent
Ladd et al.

(10) Patent No.: US 6,998,445 B2
(45) Date of Patent: *Feb. 14, 2006

(54) LOW COMPRESSION, RESILIENT GOLF BALLS WITH RUBBER CORE

(75) Inventors: Derek A. Ladd, Vista, CA (US); Laurent C. Bissonnette, Portsmouth, RI (US); David A. Bulpett, Boston, MA (US); Murali Rajagopalan, South Dartmouth, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/190,705

(22) Filed: Jul. 9, 2002

(65) Prior Publication Data

US 2003/0119989 A1 Jun. 26, 2003

Related U.S. Application Data

(63) Continuation-in-part of application No. 09/951,963, filed on Sep. 13, 2001, now Pat. No. 6,635,716, which is a continuation-in-part of application No. 09/721,740, filed on Nov. 27, 2000, now Pat. No. 6,486,261, which is a continuation-in-part of application No. 09/575,238, filed on May 22, 2000, now Pat. No. 6,417,278, which is a continuation-in-part of application No. 09/461,736, filed on Dec. 16, 1999, now Pat. No. 6,465,578, application No. 09/461,421, filed on Dec. 16, 1999, now Pat. No. 6,458,895, application No. 09/458,676, filed on Dec. 10, 1999, now Pat. No. 6,291,592, application No. 09/307,753, filed on May 10, 1999, now Pat. No. 6,162,135, which is a continuation-in-part of application No. 09/048,348, filed on Mar. 26, 1998, now Pat. No. 6,093,357.

(60) Provisional application No. 60/113,949, filed on Dec. 24, 1998.

(51) Int. Cl.
A63B 37/06 (2006.01)
A63B 37/00 (2006.01)

(52) U.S. Cl. ............... 525/261; 525/274; 473/371; 473/372; 473/377

(58) Field of Classification Search ............... 525/261, 525/274; 473/371, 372, 377
See application file for complete search history.

(56) References Cited

U.S. PATENT DOCUMENTS

| | | | |
|---|---|---|---|
| 3,147,324 A | 9/1964 | Ward | 264/254 |
| 3,239,228 A | 3/1966 | Crompton | 273/218 |
| 3,572,721 A | 3/1971 | Harrison et al. | 372/218 |
| 3,572,722 A | 3/1971 | Harrison et al. | 273/218 |
| 3,804,421 A | 3/1974 | Alex et al. | 273/218 |
| 3,808,077 A | 4/1974 | Reiser et al. | 156/102 |
| 3,896,102 A | 7/1975 | Naylor | 260/94.3 |
| 3,926,933 A | 12/1975 | Naylor | 260/94.3 |
| 3,989,568 A | 11/1976 | Isaac | 156/182 |
| 3,992,014 A | 11/1976 | Retford | 273/218 |
| 4,020,007 A | 4/1977 | Naylor | 252/429 B |
| 4,020,008 A | 4/1977 | Naylor | 252/429 B |
| 4,020,115 A | 4/1977 | Hargis et al. | 260/632 A |
| 4,062,825 A | 12/1977 | Watabe et al. | 260/32 N |
| 4,123,061 A | 10/1978 | Desbiber | 273/220 |
| 4,274,637 A | 6/1981 | Molitor | 273/235 R |
| 4,310,582 A | 1/1982 | Stumpe, Jr. | 428/182 |
| 4,560,168 A | 12/1985 | Aoyama | 273/232 |
| 4,650,193 A | 3/1987 | Molitor et al. | 273/228 |
| 4,692,497 A | 9/1987 | Gendreau et al. | 525/263 |
| 4,925,193 A | 5/1990 | Melvin et al. | 273/232 |
| 4,931,376 A | 6/1990 | Ikematsu et al. | 526/164 |
| 4,960,281 A | 10/1990 | Aoyama | 273/232 |
| 4,971,329 A | 11/1990 | Llort et al. | 273/218 |
| 5,006,297 A | 4/1991 | Brown et al. | 264/234 |
| 5,017,636 A | 5/1991 | Hattori et al. | 524/300 |
| 5,025,059 A | 6/1991 | Mouri et al. | 524/495 |
| 5,131,662 A | 7/1992 | Pollitt | 273/230 |
| 5,141,233 A | 8/1992 | Yuki et al. | 273/218 |
| 5,249,804 A | 10/1993 | Sanchez | 273/232 |
| 5,252,652 A | 10/1993 | Egashira et al. | 524/392 |
| 5,298,217 A * | 3/1994 | Mitchell | 264/331.13 |
| 5,334,673 A | 8/1994 | Wu | 273/235 R |
| 5,421,580 A | 6/1995 | Sugimoto et al. | 273/227 |
| 5,461,109 A | 10/1995 | Blair et al. | 524/839 |
| 5,484,870 A | 1/1996 | Wu | 528/28 |
| 5,496,496 A | 3/1996 | Kajita et al. | 252/182.24 |
| 5,562,552 A | 10/1996 | Thurman | 473/379 |
| 5,575,477 A | 11/1996 | Hwang | 473/379 |
| 5,585,440 A | 12/1996 | Yamada et al. | 525/193 |
| 5,587,420 A | 12/1996 | Takizawa et al. | 524/572 |
| 5,692,974 A | 12/1997 | Wu et al. | 473/377 |
| 5,697,856 A | 12/1997 | Moriyama et al. | 473/374 |
| 5,744,549 A | 4/1998 | Lutz | 525/129 |
| 5,779,561 A | 7/1998 | Sullivan et al. | 473/373 |
| 5,803,831 A | 9/1998 | Sullivan et al. | 473/374 |
| 5,816,944 A | 10/1998 | Asakura et al. | 473/372 |
| 5,827,134 A | 10/1998 | Sullivan et al. | 473/372 |

(Continued)

FOREIGN PATENT DOCUMENTS

AU       A-16547/97       2/1997

(Continued)

Primary Examiner—David J. Buttner
(74) Attorney, Agent, or Firm—Swidler Berlin LLP

(57) ABSTRACT

A low compression, resilient golf ball having a center including a material formed from the conversion reaction of sufficient amounts of polybutadiene, a free radical source, and a cis-to-trans catalyst to convert a portion of cis-isomer to trans-isomer in the polybutadiene, wherein said material has an amount of trans-isomer greater than the amount of trans-isomer present before the conversion reaction, and wherein the reaction product is susbstantially free of antioxidant.

21 Claims, 1 Drawing Sheet

U.S. PATENT DOCUMENTS

| | | | |
|---|---|---|---|
| 5,856,388 A | 1/1999 | Harris et al. | 524/320 |
| 5,859,153 A | 1/1999 | Kirk et al. | 525/481 |
| 5,861,465 A | 1/1999 | Hamada et al. | 525/332.6 |
| 5,885,173 A | 3/1999 | Keller | 473/385 |
| 5,908,358 A | 6/1999 | Wu | 473/378 |
| 5,919,101 A | 7/1999 | Yokota et al. | 473/374 |
| 5,929,171 A | 7/1999 | Sano et al. | 525/261 |
| 5,957,787 A | 9/1999 | Hwang | 473/379 |
| 5,971,870 A * | 10/1999 | Sullivan et al. | 473/373 |
| 6,012,997 A | 1/2000 | Mason | 473/594 |
| 6,018,007 A | 1/2000 | Lynch | 526/164 |
| 6,190,268 B1 | 2/2001 | Dewanjee | 473/370 |
| 6,213,898 B1 | 4/2001 | Ogg | 473/378 |
| 6,287,218 B1 * | 9/2001 | Ohama | 473/377 |
| 6,290,611 B1 | 9/2001 | Rajagopalan et al. | 473/371 |
| 6,290,615 B1 | 9/2001 | Ogg | 473/378 |
| 6,309,313 B1 | 10/2001 | Peter | 473/378 |
| 6,315,684 B1 | 11/2001 | Binette et al. | 473/377 |
| 6,338,684 B1 | 1/2002 | Winfield et al. | 473/378 |
| 6,358,161 B1 | 3/2002 | Aoyama | 473/383 |
| 6,465,578 B1 * | 10/2002 | Bissonnette et al. | 525/261 |
| 6,486,261 B1 * | 11/2002 | Wu et al. | 525/322.6 |
| 6,558,276 B1 * | 5/2003 | Yokota et al. | 473/377 |
| 6,575,849 B2 * | 6/2003 | Hayashi et al. | 473/377 |
| 6,592,471 B1 * | 7/2003 | Watanabe et al. | 473/377 |
| 6,659,887 B2 * | 12/2003 | Watanabe | 473/371 |
| 6,692,381 B2 * | 2/2004 | Sakagami et al. | 473/377 |
| 6,786,836 B2 * | 9/2004 | Higuchi et al. | 473/351 |
| 2002/0019271 A1 * | 2/2002 | Maruko et al. | 473/371 |

FOREIGN PATENT DOCUMENTS

| | | | |
|---|---|---|---|
| AU | A-16548/97 | | 2/1997 |
| AU | 703884 | * | 3/1997 |
| AU | 703884 | | 7/1999 |
| EP | 0 577 058 A1 | | 1/1994 |
| EP | 0 903 357 A1 | | 3/1999 |
| GB | 1 168 609 | | 10/1969 |
| GB | 1 209 032 | | 10/1970 |
| GB | 2 321 021 A | | 3/1997 |
| JP | 10192446 | * | 7/1998 |
| WO | WO-01/43832 | * | 6/2001 |

* cited by examiner

LOW COMPRESSION, RESILIENT GOLF BALLS WITH RUBBER CORE

CROSS-REFERENCE TO RELATED APPLICATIONS

This application is a continuation-in-part of U.S. patent application Ser. No. 09/575,238, filed May 22, 2000, now U.S. Pat. No. 6,417,278, which is a continuation-in-part of U.S. patent application Ser. No. 09/048,348, filed Mar. 26, 1998, now U.S. Pat. No. 6,093,357, U.S. patent application Ser. No. 09/307,753, filed May 10, 1999, now U.S. Pat. No. 6,162,135, U.S. patent application Ser. No. 09/458,676, filed Dec. 10, 1999, now U.S. Pat. No. 6,291,592, U.S. patent application Ser. No. 09/461,421, filed Dec. 16, 1999, now U.S. Pat. No. 6,458,895, and U.S. patent application Ser. No. 09/461,736, filed Dec. 16, 1999, now U.S. Pat. No. 6,465,578, each of which claims priority to U.S. Provisional Patent Application No. 60/113,949, filed Dec. 24, 1998. This application is also a continuation-in-part of U.S. patent application Ser. No. 09/721,740, filed Nov. 27, 2000, now U.S. Pat. No. 6,486,261, which is a continuation-in-part of U.S. patent application Ser. No. 09/461,736, filed Dec. 16, 1999, now U.S. Pat. No. 6,465,578, which claims priority to U.S. Provisional Patent Application No. 60/113,949, filed Dec. 24, 1998. This application is also a continuation-in-part of U.S. patent application Ser. No. 09/951,963, filed Sep. 13, 2001, now pending U.S. Pat. No. 6,635,716. These applications are incorporated in their entirety by reference herein.

FIELD OF THE INVENTION

The present invention relates to low compression, resilient golf balls and portions thereof formed from the conversion reaction of sufficient amounts of polybutadiene, a free radical source, and a cis-to-trans catalyst to convert a portion of cis-isomer to trans-isomer in the polybutadiene, which reaction occurs at a sufficient temperature to form the material that contains trans-isomer and cis-isomer, wherein said material has an amount of trans-isomer greater than the amount of trans-isomer present before the conversion reaction, at least one intermediate layer disposed about the center and including a resilient polymer component and a reinforcing polymer component present in an amount sufficient to provide an uncrosslinked first mixture having a rigidity as determined by a flexural modulus greater than about 3.5 MPa (508 psi), and a cover being disposed about the core.

BACKGROUND OF THE INVENTION

Conventional golf balls, solid or wound, typically have at least one core layer and at least one cover layer. Two-piece balls having a solid construction are popular with golfers because they provide a very durable ball with high initial velocity resulting in longer flight distance. Due to the rigidity of the materials used, however, the balls have a "hard" feel when struck with a club and a relatively low spin rate that makes them difficult to control, particularly on shorter approach shots.

Wound balls, i.e., spherical solid rubber or liquid center with a tensioned elastomeric thread wound thereon, are preferred by some golfers for a softer feel and higher spin enabling better control in and around the green. Wound balls typically travel a shorter distance, however, when struck as compared to a two piece ball. Moreover, as a result of their more complex structure, wound balls generally require a longer time to manufacture and are more expensive to produce than a conventional two piece ball.

Solid cores, used in wound or solid golf balls, are generally formed of a polybutadiene composition. In addition to one-piece cores, solid cores can also contain a number of outer layers, such as in a dual core golf ball. Covers, for solid or wound balls, are generally formed of ionomer resins, balata, or polyurethane, and can consist of a single layer or include one or more layers, e.g., a dual cover with an inner and outer cover layer, and optionally at least one intermediate layer disposed about the core.

The difference in play characteristics resulting from these different types of materials and constructions can be quite significant. Thus, in an attempt to provide golf balls that deliver the maximum performance in terms of both distance and spin rate for golfers of all skill levels, while still maintaining the desired aesthetic qualities discussed above, a number of golf ball manufacturers have introduced various multilayer golf balls, wherein the layers are formed of different or similar materials.

While advances have been made, there remains a need in the golf ball manufacturing art to provide an optimal golf ball with a soft feel, good spin, and distance. The present invention, therefore, is directed to a golf ball with improved core and cover compositions incorporated into a golf ball with an improved construction.

SUMMARY OF THE INVENTION

All of the embodiments according to the invention below may be used in any golf ball. Particularly, each embodiment may be used in one of the following embodiments. In general, the golf ball of the invention includes a core and a cover disposed concentrically about the core and the material formed from a conversion reaction (reaction product) is preferably disposed in at least a portion of the core. The golf ball may also include additional layers disposed in between the core and the cover.

One aspect of the invention relates to a golf ball having: (1) a center including a reaction product material formed from the conversion reaction of sufficient amounts of polybutadiene, a free radical source, and a cis-to-trans catalyst to convert a portion of cis-isomer to trans-isomer in the polybutadiene, which reaction occurs at a sufficient temperature to form the material that contains trans-isomer and cis-isomer, wherein the material has an amount of trans-isomer greater than the amount of trans-isomer present before the conversion reaction, (2) at least one intermediate layer disposed about the center and including a resilient polymer component and a reinforcing polymer component present in an amount sufficient to provide an uncrosslinked first mixture having a rigidity as determined by a flexural modulus greater than about 3.5 MPa, wherein the center and each intermediate layer together form the core, and (3) a cover being disposed about the core.

In one embodiment, the cover has at least one of a dimple coverage of greater than about 60 percent, a hardness from about 35 to 80 Shore D, or a flexural modulus of greater than about 500 psi, and wherein the golf ball has at least one of a compression from about 50 to 120 or a coefficient of restitution of greater than about 0.7. In another embodiment, the reaction product has a first dynamic stiffness measured at −50° C. that is less than about 130 percent of a second dynamic stiffness measured at 0° C.

In this aspect of the invention, the cis-to-trans catalyst may include an organosulfur compound, an inorganic sulfide, a Group VIA component, or a combination thereof. In one embodiment, the organosulfur compound is substantially free of metal and includes at least one of diphenyl disulfide or ditolyl disulfide, or both. In another embodiment, the organosulfur component includes ditolyl disulfide.

The cis-to-trans catalyst is typically present in an amount from about 0.1 to 25 parts per hundred of polybutadiene. In another embodiment, the cis-to-trans catalyst is present in an amount from about 0.1 to 12 parts per hundred of polybutadiene. In yet another embodiment, the cis-to-trans catalyst is present in an amount from about 0.1 to 8 parts per hundred of polybutadiene. In one embodiment, the cis-to-trans catalyst is present in an amount sufficient to produce the polybutadiene reaction product so as to contain at least about 32 percent trans-isomer.

In another embodiment, the cis-to-trans catalyst further includes at least one of an aromatic organometallic compound, a metal-organosulfur compound, an aromatic organic compound, or a combination thereof.

When elemental sulfur or polymeric sulfur, or both, are included in a Group VIA component in the cis-to-trans catalyst, the reaction product may further include a vulcanization accelerator. In one embodiment, the vulcanization accelerator includes at least one of sulfenamide, thiazole, dithiocarbamate, thiuram, xanthate, thiadiazine, thiourea, guanadine, or aldehyde-amine. The accelerator, when used, may be present in an amount from about 0.05 to 2 phr. In one embodiment, the optional accelerator is present in an amount from about 0.1 to 1 phr.

In one embodiment, the polybutadiene reaction product includes less than about 7 percent vinyl-isomer content based on the total polybutadiene. In another embodiment, the polybutadiene reaction product includes less than about 4 percent vinyl-isomer. In yet another embodiment, the polybutadiene reaction product includes less than about 2 percent vinyl-isomer.

The invention also includes a golf ball wherein the center including the material has a first point having a first hardness and a second point having a second hardness that is at least about 10 percent greater than the first hardness. In one embodiment, the golf ball center has a diameter from about 0.85 inches to 1.4 inches. In another embodiment, the core has a diameter from about 1.5 inches to 1.62 inches, while preferably the core has a diameter from about 1.51 inches to 1.6 inches.

The reaction product material formed from the conversion reaction may have a first amount of trans-isomer at a first point in the center and a second amount of trans-isomer at a second point in the center, and wherein the first amount of trans-isomer is at least about 6 percent less than the second amount of trans-isomer. In one embodiment, the first amount of trans-isomer is at least about 10 percent less than the second amount of trans-isomer. In another embodiment, the second point has from about 35 percent to 60 percent of trans-isomer polybutadiene. In yet another embodiment, the second point has from about 40 percent to 50 percent of trans-isomer polybutadiene.

The reinforcing polymer component in an intermediate layer may be present in an amount of about 1 to 40 weight percent of the at least one intermediate layer and may include at least one of a block copolymer ether/ester, an acrylic polyol, a trans-polyisoprene, a trans-isomer polybutadiene, a 1,2-polybutadiene, an ethylene-vinyl acetate copolymer, a polyethylene or copolymer thereof, a trans-polycyclooctenamer, or a combination thereof. In one embodiment, the reinforcing polymer component includes trans-polyisoprene. In another embodiment, the reinforcing polymer component includes a polybutadiene polymer with a trans-content greater than 90 percent and a vinyl content of less than 9 percent.

In one embodiment, the intermediate layer, which includes the uncrosslinked first mixture, has a rigidity as measured by a flexural modulus greater than about 7 MPa (~1,020 psi). All of the intermediate layers together may have a total thickness of about 0.08 inches to 0.6 inches.

In another embodiment, at least one intermediate layer includes a tensioned elastomeric material wound about the center. This tensioned elastomeric material may include the same or a different polybutadiene reaction product as the center.

The cover may have a thickness of at least about 0.03 inches. In one embodiment, the cover has a thickness of about 0.03 to 0.125 inches. In another embodiment, the cover has a Shore D hardness of about 58 to 68. In one embodiment, the cover includes at least two layers.

The present invention also relates to a golf ball having: (1) a center including a reaction product material formed from the conversion reaction of sufficient amounts of polybutadiene, a free radical source, and a cis-to-trans catalyst to convert a portion of cis-isomer to trans-isomer in the polybutadiene, which reaction occurs at a sufficient temperature to form the material that contains trans-isomer and cis-isomer, wherein the material has an amount of trans-isomer greater than the amount of trans-isomer present before the conversion reaction, (2) at least one intermediate layer disposed about the center and including a resilient polymer component and a trans-polyisoprene component present in an amount of at least about 10 percent based on the total polymer content of the intermediate layer, and (3) a cover being disposed about the core. In one embodiment, the trans-polyisoprene component is present in an amount of about 10 percent to 40 percent.

The present invention is further related to a golf ball having: (1) a center including a reaction product material formed from the conversion reaction of sufficient amounts of polybutadiene, a free radical source, and a cis-to-trans catalyst to convert a portion of cis-isomer to trans-isomer in the polybutadiene, which reaction occurs at a sufficient temperature to form the material that contains trans-isomer and cis-isomer, wherein the material has an amount of trans-isomer greater than the amount of trans-isomer present before the conversion reaction, (2) at least one intermediate layer disposed about the center and including a resilient polymer component and a trans-polybutadiene component present in an amount of at least about 15 percent based on the total polymer content of the intermediate layer, and (3) a cover being disposed about the core. In one embodiment, the trans-polybutadiene component is present in an amount of about 15 percent to 40 percent.

The present invention is also directed to a golf ball comprising a center including a polybutadiene having a molecular weight of greater than 200,000 and a resilience index of at least about 40; and a cover layer comprising a polyurethane composition formed from a prepolymer having no greater than 7.5 percent by weight unreacted isocyanate groups. In one embodiment, the resilience index is greater than about 50.

The prepolymer may include an isocyanate, at least one polyol, and at least one curing agent. In one embodiment, the isocyanate includes 4,4'-diphenylmethane diisocyanate, polymeric 4,4'-diphenylmethane diisocyanate, carbodiimide-modified liquid 4,4'-diphenylmethane diisocyanate, 4,4'-dicyclohexylmethane diisocyanate, p-phenylene diisocyanate, toluene diisocyanate, isophoronediisocyanate, p-methylxylene diisocyanate, m-methylxylene diisocyanate, o-methylxylene diisocyanate, or a mixture thereof. The at least one polyol may include polyether polyols, hydroxy-terminated polybutadiene, polyester polyols, polycaprolactone polyols, polycarbonate polyols, and mixtures thereof.

The curing agent may include a polyamine curing agent, a polyol curing agent, or a mixture thereof. In one embodiment, the curing agent is a polyamine curing agent. The polyamine curing agent may include 3,5-dimethylthio-2,4-toluenediamine and isomers thereof; 3,5-diethyltoluene-2,4-diamine and isomers thereof; 4,4'-bis-(sec-butylamino)-diphenylmethane; 1,4-bis-(sec-butylamino)-benzene, 4,4'-methylene-bis-(2-chloroaniline); 4,4'-methylene-bis-(3-chloro-2,6-diethylaniline); trimethylene glycol-di-p-aminobenzoate; polytetramethyleneoxide-di-p-aminobenzoate; N,N'-dialkyldiamino diphenyl methane; p, p'-methylene dianiline; phenylenediamine; 4,4'-methylene-bis-(2-chloroaniline); 4,4'-methylene-bis-(2,6-diethylaniline); 4,4'-diamino-3,3'-diethyl-5,5'-dimethyl -diphenylmethane; 2,2', 3,3'-tetrachloro diamino diphenylmethane; 4,4'-methylene-bis-(3-chloro-2,6-diethylaniline); and mixtures thereof.

In another embodiment, the curing agent is a polyol curing agent. The polyol curing agent may include ethylene glycol; diethylene glycol; polyethylene glycol; propylene glycol; polypropylene glycol; lower molecular weight polytetramethylene ether glycol; 1,3-bis(2-hydroxyethoxy) benzene; 1,3-bis-[2-(2-hydroxyethoxy)ethoxy] benzene; 1,3-bis-{2-[2-(2-hydroxyethoxy) ethoxy]ethoxy} benzene; 1,4-butanediol; 1,5-pentanediol; 1,6-hexanediol; resorcinol-di-(β-hydroxyethyl) ether; hydroquinone-di-(β-hydroxyethyl) ether; trimethylol propane, and mixtures thereof.

In one embodiment, the prepolymer has between about 2.5 percent and about 7.5 percent by weight unreacted isocyanate groups. In another embodiment, the cover layer has a thickness of less than about 0.05 inches. In yet another embodiment, the center has a Mooney viscosity of between about 40 and about 80 and, preferably, between about 45 and about 60.

In one embodiment, the polybutadiene has a vinyl-polybutadiene isomer content of less than about 2 percent by weight and the polybutadiene has a cis-isomer content of at least about 95 percent by weight.

In one embodiment, the golf ball center outer diameter is no less than about 1.55 inches and, additionally, the center further includes a material formed from a conversion reaction of polybutadiene having a first amount of trans-polybutadiene, a free radical source, and at least one cis-to-trans catalyst. The reaction may occur at a temperature sufficient to form a polybutadiene reaction product having an second amount of trans-polybutadiene greater than the first amount of trans-polybutadiene. The cis-to-trans catalyst may include at least one of a organosulfur component, an inorganic sulfur compound, an aromatic organometallic compound, a metal-organosulfur compound, tellurium, selenium, elemental sulfur, a polymeric sulfur, or an aromatic organic compound. The organosulfur component may include at least one of 4,4'-diphenyl disulfide, 4,4'-ditolyl disulfide, or 2,2'-benzamido diphenyl disulfide. In one embodiment, the cis-to-trans catalyst is present in an amount from about 0.1 to 10 parts per hundred of polybutadiene.

In another embodiment, the golf ball further includes an intermediate layer juxtaposed between the center and the cover layer, wherein the intermediate layer comprises a material formed from a conversion reaction of polybutadiene having a first amount of trans-polybutadiene, a free radical source, and a cis-to-trans catalyst comprising at least one organosulfur component, wherein the intermediate layer has an outer diameter of no less than about 1.58 inches, and wherein the center has an outer diameter of less than about 1.55 inches. In yet another embodiment, the cover layer comprises an inner cover layer and an outer cover layer, the inner cover layer juxtaposed the center and the outer cover layer. At least one of the inner and outer cover layers may have a thickness of less than about 0.05 inches.

If present, the inner cover layer may be formed from at least one material selected from the group comprising of an ionomer resin, a polyurethane, a polyetherester, a polyetheramide, a polyester, a dynamically vulcanized elastomer, a functionalized styrenebutadiene elastomer, a metallocene polymer, nylon, acrylonitrile butadiene-styrene copolymer or blends thereof. In yet another embodiment, the inner cover has an outer diameter of at least about 1.55 inches and, preferably, between about 1.58 and about 1.64 inches. In an additional embodiment, the polyurethane is a thermoplastic or thermoset material.

The present invention is also directed to a golf ball comprising a center comprising a polybutadiene having a molecular weight of greater than 300,000 and a resilience index of at least about 40; an outer core layer having an outer diameter of no less than about 1.51 inches; an inner cover layer surrounding the outer core layer; and an outer cover layer comprising of a polyurethane composition formed from a prepolymer having no greater than about 7.5 percent by weight unreacted isocyanate groups. In one embodiment, the resilience index is greater than about 50.

The prepolymer may include an isocyanate, at least one polyol, and at least one curing agent. In one embodiment, the isocyanate includes 4,4'-diphenylmethane diisocyanate, polymeric 4,4'-diphenylmethane diisocyanate, carbodiimide-modified liquid 4,4'-diphenylmethane diisocyanate, 4,4'-dicyclohexylmethane diisocyanate, p-phenylene diisocyanate, toluene diisocyanate, isophoronediisocyanate, p-methylxylene diisocyanate, m-methylxylene diisocyanate, o-methylxylene diisocyanate, or a mixture thereof. The at least one polyol may include polyether polyols, hydroxy-terminated polybutadiene, polyester polyols, polycaprolactone polyols, polycarbonate polyols, and mixtures thereof.

The curing agent may include a polyamine curing agent, a polyol curing agent, or a mixture thereof. If the polyamine is selected as the curing agent, the polyamine curing agent may include 3,5-dimethylthio-2,4-toluenediamine and isomers thereof; 3,5-diethyltoluene-2,4-diamine and isomers thereof; 4,4'-bis-(sec-butylamino)-diphenylmethane; 1,4-bis-(sec-butylamino)-benzene, 4,4'-methylene-bis-(2-chloroaniline); 4,4'-methylene-bis-(3-chloro-2,6-diethylaniline); trimethylene glycol-di-p-aminobenzoate; polytetramethyleneoxide-di-p-aminobenzoate; N,N'-dialkyldiamino diphenyl methane; p, p'-methylene dianiline; phenylenediamine; 4,4'-methylene-bis-(2-chloroaniline); 4,4'-methylene-bis-(2,6-diethylaniline); 4,4'-diamino-3,3'-diethyl-5,5'-dimethyl diphenylmethane; 2,2',3,3'-tetrachloro diamino diphenylmethane; 4,4'-methylene-bis-(3-chloro-2,6-diethylaniline); and mixtures thereof. If the curing agent is a polyol, preferably, the polyol curing agent includes ethylene glycol; diethylene glycol; polyethylene glycol; propylene glycol; polypropylene glycol; lower molecular weight polytetramethylene ether glycol; 1,3-bis(2-hydroxyethoxy) benzene; 1,3-bis-[2-(2-hydroxyethoxy) ethoxy]benzene; 1,3-bis-{2-[2-(2-hydroxyethoxy) ethoxy] ethoxy} benzene; 1,4-butanediol; 1,5-pentanediol; 1,6-hexanediol; resorcinol-di-(-hydroxyethyl) ether; hydroquinone-di-(-hydroxyethyl) ether; trimethylol propane, and mixtures thereof.

In another embodiment, the prepolymer has between about 2.5 percent and about 7.5 percent by weight unreacted isocyanate groups. At least one of the inner and outer cover layers preferably may have a thickness of less than about 0.05 inches. The center may have a Mooney viscosity of between about 40 and about 80. In one embodiment, the polybutadiene has a vinyl-polybutadiene isomer content of less than about 2 percent by weight and the polybutadiene has a cis-isomer content of at least about 95 percent by weight.

In one embodiment, the golf ball center outer diameter is no less than about 1.55 inches and, additionally, the center further includes a material formed from a conversion reaction of polybutadiene having a first amount of trans-polybutadiene, a free radical source, and at least one cis-to-trans catalyst. In another embodiment, the reaction occurs at a temperature sufficient to form a polybutadiene reaction product having an second amount of trans-polybutadiene greater than the first amount of trans-polybutadiene. The cis-to-trans catalyst may include at least one of an organosulfur compound, an inorganic sulfur compound, an aromatic organometallic compound, a metal-organosulfur compound, tellurium, selenium, elemental sulfur, a polymeric sulfur, or an aromatic organic compound. The organosulfur component may include at least one of 4,4'-diphenyl disulfide, 4,4'-ditolyl disulfide, or 2,2'-benzamido diphenyl disulfide. In yet another embodiment, the cis-to-trans catalyst is present in an amount from about 0.1 to 10 parts per hundred of polybutadiene.

In one embodiment, the inner cover layer may be formed from an ionomer resin, a polyurethane, a polyetherester, a polyetheramide, a polyester, a dynamically vulcanized elastomer, a functionalized styrenebutadiene elastomer, a metallocene polymer nylon, acrylonitrile butadiene-styrene copolymer or blends thereof. The inner cover may have an outer diameter of at least about 1.55 inches and, preferably, between about 1.58 and about 1.64 inches. In an additional embodiment, the polyurethane is a thermoplastic or thermoset material.

The present invention is also directed to a golf ball comprising a center formed of a cis-polybutadiene having a molecular weight of greater than 300,000 and a resilience index of at least about 40; an outer core layer having an outer diameter of no less than about 1.51 inches; an inner cover layer surrounding the outer core layer, the inner cover layer comprising a polyurethane; and an outer cover layer comprising an ionomer or an elastomeric material.

The present invention is also directed to a golf ball comprising a center comprising a polybutadiene having a molecular weight of greater than 300,000 and a resilience index of at least about 40; an outer core layer having an outer diameter of no less than about 1.51 inches; an inner cover layer surrounding the outer core layer; and an outer cover layer; wherein the inner and outer cover layers are formed of a polyurethane composition.

The present invention is further directed to a golf ball formed of a core and a cover, wherein the core has a diameter of at least about 1.50 inches and comprises a polybutadiene rubber composition comprising at least about 2.2 parts per hundred of a halogenated organosulfur compound, and wherein the cover has a thickness of less than about 0.1 inches.

The core may include a center and an outer core layer and the core preferably has a diameter of at least about 1.55 inches. The cover may include an inner cover layer and an outer cover layer and, preferably, at least one of the inner and outer cover layers has a thickness of less than about 0.05 inches. Either of the cover layers may include an ionomeric material, vinyl resins, polyolefins, polyurethanes, polyureas, polyamides, acrylic resins, thermoplastics, polyphenylene oxide resins, thermoplastic polyesters, thermoplastic rubbers, fully-neutralized polymers, partially-neutralized polymers, and mixtures thereof.

The polybutadiene rubber composition may include between about 2.2 parts and about 5 parts of a halogenated organosulfur compound. The halogenated organosulfur compound may include pentafluorothiophenol; 2-fluorothiophenol; 3-fluorothiophenol; 4-fluorothiophenol; 2,3-fluorothiophenol; 2,4-fluorothiophenol; 3,4-fluorothiophenol; 3,5-fluorothiophenol 2,3,4-fluorothiophenol; 3,4,5-fluorothiophenol; 2,3,4,5-tetrafluorothiophenol; 2,3,5,6-tetrafluorothiophenol; 4-chlorotetrafluorothiophenol; pentachlorothiophenol; 2-chlorothiophenol; 3-chlorothiophenol; 4-chlorothiophenol; 2,3-chlorothiophenol; 2,4-chlorothiophenol; 3,4-chlorothiophenol; 3,5-chlorothiophenol; 2,3,4-chlorothiophenol; 3,4,5-chlorothiophenol; 2,3,4,5-tetrachlorothiophenol; 2,3,5,6-tetrachlorothiophenol; pentabromothiophenol; 2-bromothiophenol; 3-bromothiophenol; 4-bromothiophenol; 2,3-bromothiophenol; 2,4-bromothiophenol; 3,4-bromothiophenol; 3,5-bromothiophenol; 2,3,4-bromothiophenol; 3,4,5-bromothiophenol; 2,3,4,5-tetrabromothiophenol; 2,3,5,6-tetrabromothiophenol; pentaiodothiophenol; 2-iodothiophenol; 3-iodothiophenol; 4-iodothiophenol; 2,3-iodothiophenol; 2,4-iodothiophenol; 3,4-iodothiophenol; 3,5-iodothiophenol; 2,3,4-iodothiophenol; 3,4,5-iodothiophenol; 2,3,4,5-tetraiodothiophenol; 2,3,5,6-tetraiodothiophenoland; and their zinc salts, the metal salts thereof, and mixtures thereof, but is preferably pentachlorothiophenol or the metal salt thereof. The metal salt may be zinc, calcium, potassium, magnesium, sodium, and lithium, but is preferably zinc.

The polybutadiene composition may further include an α,β-unsaturated carboxylic acid or a metal salt thereof, an organic peroxide, and a filler. If the outer cover layer includes polyurethane, it includes a prepolymer formed of a polyisocyanate and a polyol, and a curing agent. Preferably, at least one of the prepolymer and curing agent are saturated. In an alternative embodiment, the polyurethane composition comprises at least one of a UV absorber, a hindered amine light stabilizer, or an optical brightener.

In one embodiment, the core has a compression less than about 75 and the golf ball has a coefficient of restitution of greater than about 0.800. In another, the core has a compression less than about 75 and the golf ball has a coefficient of restitution of greater than about 0.815. In still another, the core has a compression less than about 55 and the golf ball has a coefficient of restitution of greater than about 0.800.

In another embodiment, the outer cover layer is formed of a polyurethane composition comprising a prepolymer formed of a polyisocyanate and a polyol, and a curing agent. At least one of the prepolymer and curing agent are saturated. In a preferred embodiment, the polyurethane composition comprises at least one of a UV absorber, a hindered amine light stabilizer, or an optical brightener.

The present invention is also directed to a golf ball formed of a core and a cover, wherein the core has a diameter of at least about 1.55 inches and comprises a polybutadiene rubber composition comprising greater than about 2.3 parts per hundred of pentachlorothiophenol or a metal salt thereof, and wherein the cover comprises an inner cover layer comprising an ionomeric material and having a thickness of less than about 0.04 inches; and an outer cover layer having a thickness of less than about 0.04 inches and comprising a polyurethane composition.

BRIEF DESCRIPTION OF THE DRAWINGS

Further features and advantages of the invention can be ascertained from the following detailed description that is provided in connection with the drawing(s) described below.

DETAILED DESCRIPTION OF THE INVENTION

Figure 1:
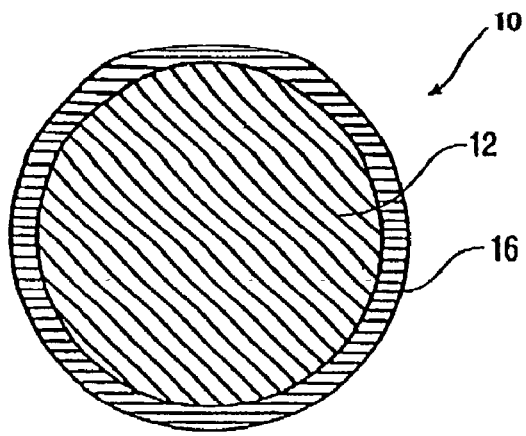
FIG. 1 is a cross-sectional view of a two-piece golf ball having a cover and a core according to the invention.

The present invention relates to a variety of golf ball constructions, i.e., one-piece, two-piece, or multilayer balls. As used herein, the term "multilayer" refers to golf balls having at least two layers, which includes wound balls and balls with multiple core, intermediate, and cover layers.

The golf balls of the invention may have a solid, hollow, or fluid-filled center. For example, the core of the golf ball may include a conventional center surrounded by an intermediate or outer core layer disposed between the center and the inner cover layer. The core may be solid or liquid, and may be a single layer or may include a plurality of layers. The core may also include a solid or liquid filled center around which many yards of a tensioned elastomeric material are wound. As with the core, the intermediate layer or outer core layer may also include a plurality of layers.

A reaction product that includes a cis-to-trans catalyst, a resilient polymer component having polybutadiene, a free radical source, and optionally, a crosslinking agent, a filler, or both, may be incorporated into any layer of the golf balls of the invention. Various combinations of polymers, cis-to-trans catalysts, fillers, crosslinkers, and a source of free radicals may be used to form the reaction product. In one embodiment, the polybutadiene reaction product is used to form a portion of the center, at least one intermediate layer, or both.

Core Compositions

As stated above, the center of the ball may be solid or have multiple layers. A resilient polymer component having polybutadiene may be used to form one or more portions of the core.

In one embodiment, a reaction product having a cis- to trans-catalyst is used to form the center of the ball. In this embodiment, at least one intermediate layer is solid and includes a reinforcing polymer component as described herein to improve the centering of the layers within the ball.

To produce a polymer reaction product that exhibits the higher resilience and lower modulus (low compression) properties that are desirable and beneficial to golf ball playing characteristics, high-molecular-weight cis-1,4-polybutadiene is preferably converted to the trans-isomer during the molding cycle.

Polybutadiene Component

The materials for solid cores generally include compositions having a base rubber, such as polybutadiene. To obtain a higher resilience and lower compression, a high-molecular weight polybutadiene with a cis-isomer content preferably greater than about 40 percent is converted to increase the percentage of trans-isomer content at any point in the golf ball or portion thereof, preferably to increase the percentage throughout substantially all of the golf ball or portion thereof, during the molding cycle. As used herein, unless otherwise stated, the percent of cis-isomer polybutadiene, reflects the amount of cis-isomer compared to the total number of polybutadiene isomers. The fraction is multiplied by 100 to obtain the percent. The percent of trans-isomer polybutadiene, reflects the amount of trans-isomers compared to the total number of polybutadiene isomers in the composition, with this number being multiplied by 100 to determine the percentage. The percent of vinyl-isomer is similarly defined.

In one embodiment, the cis-isomer is present in an amount of greater than about 70 percent of the total polybutadiene content. In another embodiment, the cis-isomer is present in an amount greater than about 80 percent of the total polybutadiene content. In yet another embodiment, the cis-isomer is present in an amount of greater than about 90 percent of the total polybutadiene content. As used herein, the term "about" is used in connection with one or more numbers or numerical ranges, should be understood to refer to all such numbers, including all numbers in a range. In still another embodiment, the cis-isomer is present in an amount of greater than about 95 percent, and more preferably greater than about 96 percent, of the total polybutadiene content.

The polybutadiene material typically has a molecular weight of greater than about 200,000. As used herein, the term "molecular weight" is defined as the absolute weight average molecular weight. In one embodiment, the polybutadiene molecular weight is greater than about 250,000, and more preferably from about 300,000 to 500,000. In another embodiment, the polybutadiene molecular weight is about 400,000 or greater and the polydispersity is no greater than about 2.

The base (unvulcanized) rubber, such as polybutadiene, preferably has a high-Mooney-viscosity. In one embodiment, the polybutadiene has a Mooney viscosity greater than about 20, preferably greater than about 30, and more preferably greater than about 40. Mooney viscosity is typically measured according to ASTM D-1646. In another embodiment, the Mooney viscosity of the polybutadiene is greater than about 35, and preferably greater than about 50. In one embodiment, the Mooney viscosity of the unvulcanized polybutadiene is from about 40 to about 80. In another embodiment, the Mooney viscosity is from about 45 to about 60, more preferably from about 45 to about 55.

Examples of desirable polybutadiene rubbers include BUNA® CB22 and BUNA® CB23, commercially available from Bayer of Akron, Ohio; UBEPOL® 360L and UBEPOL® 150L, commercially available from UBE Industries of Tokyo, Japan; and CARIFLEX® BCP820 and CARIFLEX® BCP824, commercially available from Shell of Houston, Tex. If desired, the polybutadiene can also be mixed with other elastomers known in the art such as natural rubber, polyisoprene rubber and/or styrene-butadiene rubber in order to modify the properties of the core.

Without wishing to be bound by any particular theory, it is believed that a low amount of 1,2-polybutadiene isomer ("vinyl-polybutadiene") is desired in the initial polybutadiene, and the reaction product. Typically, the vinyl polybutadiene isomer content is less than about 7 percent. In one embodiment, the vinyl polybutadiene isomer content is less than about 4 percent. In another embodiment, the vinyl polybutadiene isomer content is less than about 2 percent.

Catalyst(s)

Without wishing to be bound by any particular theory, it is believed that the cis-to-trans catalyst component, in conjunction with the free radical source, acts to convert a percentage of the polybutadiene polymer component from the cis- to the trans-conformation. Thus, the cis-to-trans conversion requires the presence of a cis-to-trans catalyst, such as an organosulfur or metal-containing organosulfur compound, a substituted or unsubstituted aromatic organic compound that does not contain sulfur or metal, an inorganic sulfide compound, an aromatic organometallic compound, or mixtures thereof.

As used herein, "cis-to-trans catalyst" means any component or a combination thereof that will convert at least a portion of cis-isomer to trans-isomer at a given temperature. The cis-to-trans catalyst component may include one or more cis-to-trans catalysts described herein, but typically includes at least one organosulfur component, a Group VIA component, an inorganic sulfide, or a combination thereof. In one embodiment, the cis-to-trans catalyst is a blend of an organosulfur component and an inorganic sulfide component or a Group VIA component.

As used herein when referring to the invention, the term "organosulfur compound(s)" or "organosulfur component (s)," refers to any compound containing carbon, hydrogen, and sulfur. As used herein, the term "sulfur component" means a component that is elemental sulfur, polymeric sulfur, or a combination thereof. It should be further understood that "elemental sulfur" refers to the ring structure of $S_8$ and that "polymeric sulfur" is a structure including at least one additional sulfur relative to the elemental sulfur.

The cis-to-trans catalyst is typically present in an amount sufficient to produce the reaction product so as to increase the trans-polybutadiene isomer content to contain from about 5 percent to 70 percent trans-isomer polybutadiene based on the total resilient polymer component. Therefore, the cis-to-trans catalyst is preferably present in an amount from about 0.1 to about 25 parts per hundred of the total resilient polymer component. As used herein, the term "parts per hundred", also known as "phr", is defined as the number of parts by weight of a particular component present in a mixture, relative to 100 parts by weight of the total polymer component. Mathematically, this can be expressed as the weight of an ingredient divided by the total weight of the polymer, multiplied by a factor of 100. In one embodiment, the cis-to-trans catalyst is present in an amount from about 0.1 to about 12 phr of the total resilient polymer component. In another embodiment, the cis-to-trans catalyst is present in an amount from about 0.1 to about 10 phr of the total resilient polymer component. In yet another embodiment, the cis-to-trans catalyst is present in an amount from about 0.1 to about 8 phr of the total resilient polymer component. In still another embodiment, the cis-to-trans catalyst is present in an amount from about 0.1 to about 5 phr of the total resilient polymer component.

Preferably, organosulfur compounds or components includes aromatic organosulfur components, such as aryl compounds. More preferably, organosulfur components suitable for use in the invention include at least one of diphenyl disulfide; 4,4'-ditolyl disulfide; 2,2'-benzamido diphenyl disulfide; bis(2-aminophenyl) disulfide; bis(4-aminophenyl) disulfide; bis(3-aminophenyl) disulfide; 2,2'-bis(4-aminonaphthyl) disulfide; 2,2'-bis(3-aminonaphthyl) disulfide; 2,2'-bis(4-aminonaphthyl) disulfide; 2,2'-bis(5-aminonaphthyl) disulfide; 2,2'-bis(6-aminonaphthyl) disulfide; 2,2'-bis(7-aminonaphthyl) disulfide; 2,2'-bis(8-aminonaphthyl) disulfide; 1,1'-bis(2-aminonaphthyl) disulfide; 1,1'-bis(3-aminonaphthyl) disulfide; 1,1'-bis(3-aminonaphthyl) disulfide; 1,1'-bis(4-aminonaphthyl) disulfide; 1,1'-bis(5-aminonaphthyl) disulfide; 1,1'-bis(6-aminonaphthyl) disulfide; 1,1'-bis(7-aminonaphthyl) disulfide; 1,1'-bis(8-aminonaphthyl) disulfide; 1,2'-diamino-1,2'-dithiodinaphthalene; 2,3'-diamino-1,2'-dithiodinaphthalene; bis(4-chlorophenyl) disulfide; bis(2-chlorophenyl) disulfide; bis(3-chlorophenyl) disulfide; bis(4-bromophenyl) disulfide; bis(2-bromophenyl) disulfide; bis(3-bromophenyl) disulfide; bis(4-fluorophenyl) disulfide; bis(4-iodophenyl) disulfide; bis(2,5-dichlorophenyl) disulfide; bis(3,5-dichlorophenyl) disulfide; bis (2,4-dichlorophenyl) disulfide; bis(2,6-dichlorophenyl) disulfide; bis(2,5-dibromophenyl) disulfide; bis(3,5-dibromophenyl) disulfide; bis(2-chloro-5-bromophenyl) disulfide; bis(2,4,6-trichlorophenyl) disulfide; bis(2,3,4,5,6-pentachlorophenyl) disulfide; bis(4-cyanophenyl) disulfide; bis(2-cyanophenyl) disulfide; bis(4-nitrophenyl) disulfide; bis(2-nitrophenyl) disulfide; 2,2'-dithiobenzoic ethyl; 2,2'-dithiobenzoic methyl; 2,2'-dithiobenzoic acid; 4,4'-dithiobenzoic ethyl; bis(4-acetylphenyl) disulfide; bis(2-acetylphenyl) disulfide; bis(4-formylphenyl) disulfide; bis(4carbamoylphenyl) disulfide; 1,1'-dinaphthyl disulfide; 2,2'-dinaphthyl disulfide; 1,2'-dinaphthyl disulfide; 2,2'-bis(1-chlorodinaphthyl) disulfide; 2,2'-bis(1-bromonaphthyl) disulfide; 1,1'-bis(2-chloronaphthyl) disulfide; 2,2'-bis(1-cyanonaphtyl) disulfide; 2,2'-bis(1-acetylnaphthyl) disulfide; and the like; or a mixture thereof. Most preferred organosulfur components include diphenyl disulfide, 4,4'-ditolyl disulfide, or a mixture thereof, especially 4,4'-ditolyl disulfide.

In one embodiment, the at least one organosulfur component is substantially free of metal. As used herein, the term "substantially free of metal" means less than than about 10 weight percent, preferably less than about 5 weight percent, more preferably less than about 3 weight percent, even more preferably less than about 1 weight percent, and most preferably less than about 0.01 weight percent. Suitable substituted or unsubstituted aromatic organic components that do not include sulfur or a metal include, but are not limited to, diphenyl acetylene, azobenzene, or a mixture thereof. The aromatic organic group preferably ranges in size from $C_6$ to $C_{20}$, and more preferably from $C_6$ to $C_{10}$.

The organosulfur cis-to-trans catalyst, when present, is preferably present in an amount sufficient to produce the reaction product so as to contain at least about 12 percent trans-isomer at any location, but typically is greater than about 32 percent trans-isomer polybutadiene at any location based on the total resilient polymer component. The organosulfur cis-to-trans catalyst also may be present in an amount sufficient to produce the reaction product so as to contain at least about 10 percent trans-isomer at any location, more preferably at least about 15 percent, and even more preferably at least about 20 percent. In still yet another embodiment, the cis-to-trans catalyst may be present in an amount sufficient to produce the reaction product so as to contain at least about 25 percent trans-isomer at any location, more preferably at least about 30 percent, and even more preferably at least about 35 percent. Even greater amounts of cis-to-trans catalyst may be used to produce even higher amounts of trans-isomer. For instance, the cis-to-trans catalyst may be present in an amount sufficient to produce the reaction product so as to contain at least about 38 percent trans-isomer at any location, more preferably at least about 40 percent, and even more preferably at least about 45 percent.

In one embodiment, the organosulfur cis-to-trans catalyst is present in the reaction product in an amount from about 0.5 phr or greater. In another embodiment, the cis-to-trans catalyst including a Group VIA component is present in the reaction product in an amount from about 0.6 phr or greater. In yet another embodiment, the cis-to-trans catalyst including a Group VIA component is present in the reaction product in an amount from about 1.0 phr or greater. In still another embodiment, the cis-to-trans catalyst including a Group VIA component is present in the reaction product in an amount from about 2.0 phr or greater.

Suitable metal-containing organosulfur components include, but are not limited to, cadmium, copper, lead, and tellurium analogs of diethyldithiocarbamate, diamyldithiocarbamate, and dimethyldithiocarbamate, or mixtures thereof.

In one embodiment, the metal-containing organosulfur cis-to-trans catalyst is present in the reaction product in an amount from about 1.0 phr or greater. In another embodiment, the cis-to-trans catalyst including a Group VIA component is present in the reaction product in an amount from about 2.0 phr or greater. In yet another embodiment, the cis-to-trans catalyst including a Group VIA component is present in the reaction product in an amount from about 2.5 phr or greater. In still another embodiment, the cis-to-trans catalyst including a Group VIA component is present in the reaction product in an amount from about 3.0 phr or greater.

In one embodiment, organosulfur component is a halogenated organosulfur compound. Halogenated organosulfur compounds include, but are not limited to those having the following general formula:

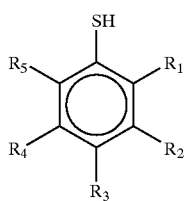

where $R_1$–$R_5$ can be $C_1$–$C_8$ alkyl groups; halogen groups; thiol groups (—SH), carboxylated groups; sulfonated groups; in any order; and also pentafluorothiophenol; 2-fluorothiophenol; 3-fluorothiophenol; 4-fluorothiophenol; 2,3-fluorothiophenol; 2,4-fluorothiophenol; 3,4-fluorothiophenol; 3,5-fluorothiophenol 2,3,4-fluorothiophenol; 3,4,5-fluorothiophenol; 2,3,4,5-tetrafluorothiophenol; 2,3,5,6-tetrafluorothiophenol; 4-chlorotetrafluorothiophenol; pentachlorothiophenol; 2-chlorothiophenol; 3-chlorothiophenol; 4-chlorothiophenol; 2,3-chlorothiophenol; 2,4-chlorothiophenol; 3,4-chlorothiophenol; 3,5-chlorothiophenol; 2,3,4-chlorothiophenol; 3,4,5-chlorothiophenol; 2,3,4,5-tetrachlorothiophenol; 2,3,5,6-tetrachlorothiophenol; pentabromothiophenol; 2-bromothiophenol; 3-bromothiophenol; 4-bromothiophenol; 2,3-bromothiophenol; 2,4-bromothiophenol; 3,4-bromothiophenol; 3,5-bromothiophenol; 2,3,4-bromothiophenol; 3,4,5-bromothiophenol; 2,3,4,5-tetrabromothiophenol; 2,3,5,6-tetrabromothiophenol; pentaiodothiophenol; 2-iodothiophenol; 3-iodothiophenol; 4-iodothiophenol; 2,3-iodothiophenol; 2,4-iodothiophenol; 3,4-iodothiophenol; 3,5-iodothiophenol; 2,3,4-iodothiophenol; 3,4,5-iodothiophenol; 2,3,4,5-tetraiodothiophenol; 2,3,5,6-tetraiodothiophenoland; and their zinc salts. Preferably, the halogenated organosulfur compound is pentachlorothiophenol, which is commercially available in neat form or under the tradename STRUKTOL®, a clay-based carrier containing the sulfur compound pentachlorothiophenol loaded at 45 percent (correlating to 2.4 parts PCTP). STRUKTOL® is commercially available from Struktol Company of America of Stow, Ohio. PCTP is commercially available in neat form from eChinachem of San Francisco, Calif. and in the salt form from eChinachem of San Francisco, Calif. Most preferably, the halogenated organosulfur compound is the zinc salt of pentachlorothiophenol, which is commercially available from eChinachem of San Francisco, Calif. The halogenated organosulfur-compounds of the present invention are preferably present in an amount greater than about 2.2 phr, more preferably between about 2.3 phr and about 5 phr, and most preferably between about 2.3 and about 4 phr.

The cis-to-trans catalyst may also include a Group VIA component. As used herein, the terms "Group VIA component" or "Group VIA element" mean a component that includes a sulfur component, selenium, tellurium, or a combination thereof. Elemental sulfur and polymeric sulfur are commercially available from, e.g., Elastochem, Inc. of Chardon, Ohio. Exemplary sulfur catalyst compounds include PB(RM-S)-80 elemental sulfur and PB(CRST)-65 polymeric sulfur, each of which is available from Elastochem, Inc. An exemplary tellurium catalyst under the tradename TELLOY and an exemplary selenium catalyst under the tradename VANDEX are each commercially available from RT Vanderbilt of Norwalk, Conn.

In one embodiment, the cis-to-trans catalyst including a Group VIA component is present in the reaction product in an amount from about 0.25 phr or greater. In another embodiment, the cis-to-trans catalyst including a Group VIA component is present in the reaction product in an amount from about 0.5 phr or greater. In yet another embodiment, the cis-to-trans catalyst including a Group VIA component is present in the reaction product in an amount from about 1.0 phr or greater.

Suitable inorganic sulfide components include, but are not limited to titanium sulfide, manganese sulfide, and sulfide analogs of iron, calcium, cobalt, molybdenum, tungsten, copper, selenium, yttrium, zinc, tin, and bismuth.

In one embodiment, the cis-to-trans catalyst including an inorganic sulfide component is present in the reaction product in an amount from about 0.5 phr or greater. In another embodiment, the cis-to-trans catalyst including a Group VIA component is present in the reaction product in an amount from about 0.75 phr or greater. In yet another embodiment, the cis-to-trans catalyst including a Group VIA component is present in the reaction product in an amount from about 1.0 phr or greater.

When a reaction product includes a blend of cis-to-trans catalysts including an organosulfur component and an inorganic sulfide component, the organosulfur component is preferably present in an amount from about 0.5 or greater, preferably 1.0 or greater, and more preferably about 1.5 or greater and the inorganic sulfide component is preferably present in an amount from about 0.5 phr or greater, preferably 0.75 phr or greater, and more preferably about 1.0 phr or greater.

A substituted or unsubstituted aromatic organic compound may also be included in the cis-to-trans catalyst. In one embodiment, the aromatic organic compound is substantially free of metal. Suitable substituted or unsubstituted aromatic organic components include, but are not limited to, components having the formula $(R_1)_x$-$R_3$-M-$R_4$-$(R_2)_y$, wherein $R_1$ and $R_2$ are each hydrogen or a substituted or unsubstituted $C_{1-20}$ linear, branched, or cyclic alkyl, alkoxy, or alkylthio group, or a single, multiple, or fused ring $C_6$ to $C_{24}$ aromatic group; x and y are each an integer from 0 to 5; $R_3$ and $R_4$ are each selected from a single, multiple, or fused ring $C_6$ to $C_{24}$ aromatic group; and M includes an azo group or a metal component. $R_3$ and $R_4$ are each preferably selected from a $C_6$ to $C_{10}$ aromatic group, more preferably selected from phenyl, benzyl, naphthyl, benzamido, and benzothiazyl. $R_1$ and $R_2$ are each preferably selected from a substituted or unsubstituted $C_{1-10}$ linear, branched, or cyclic alkyl, alkoxy, or alkylthio group or a $C_6$ to $C_{10}$ aromatic group. When $R_1$, $R_2$, $R_3$, or $R_4$, are substituted, the substitution may include one or more of the following substituent groups: hydroxy and metal salts thereof; mercapto and metal salts thereof; halogen; amino, nitro, cyano, and amido; carboxyl including esters, acids, and metal salts thereof; silyl; acrylates and metal salts thereof; sulfonyl or sulfonamide; and phosphates and phosphites. When M is a metal component, it may be any suitable elemental metal available to those of ordinary skill in the art. Typically, the metal will be a transition metal, although preferably it is tellurium or selenium.

Free Radical Source(s)

A free-radical source, often alternatively referred to as a free-radical initiator, is required in the composition and method. The free-radical source is typically a peroxide, and preferably an organic peroxide, which decomposes during the cure cycle. Suitable free-radical sources include organic peroxide compounds, such as di-t-amyl peroxide, di(2-t-butyl-peroxyisopropyl)benzene peroxide or α,α-bis (t-butylperoxy) diisopropylbenzene, 1,1-bis(t-butylperoxy)-3,3,5-trimethylcyclohexane or 1,1-di(t-butylperoxy) 3,3,5-trimethyl cyclohexane, dicumyl peroxide, di-t-butyl peroxide, 2,5-di-(t-butylperoxy)-2,5-dimethyl hexane, n-butyl-4,4-bis(t-butylperoxy)valerate, lauryl peroxide, benzoyl peroxide, t-butyl hydroperoxide, and the like, and any mixture thereof.

Other examples include, but are not limited to, VAROX® 231XL and Varox® DCP-R, commercially available from Elf Atochem of Philadelphia, Pa.; PERKODOX ® BC and PERKODOX ® 14, commercially available from Akzo Nobel of Chicago, Ill.; and ELASTOCHEM® DCP-70, commercially available from Rhein Chemie of Trenton, N.J.

It is well known that peroxides are available in a variety of forms having different activity. The activity is typically defined by the "active oxygen content." For example, PERKODOX® BC peroxide is 98 percent active and has an active oxygen content of 5.8 percent, whereas PERKODOX® DCP-70 is 70 percent active and has an active oxygen content of 4.18 percent. The peroxide is typically present in an amount greater than about 0.1 parts per hundred of the total resilient polymer component, preferably about 0.1 to 15 parts per hundred of the resilient polymer component, and more preferably about 0.2 to 5 parts per hundred of the total resilient polymer component. If the peroxide is present in pure form, it is preferably present in an amount of at least about 0.25 phr, more preferably between about 0.35 phr and about 2.5 phr, and most preferably between about 0.5 phr and about 2 phr. Peroxides are also available in concentrate form, which are well-known to have differing activities, as described above. In this case, if concentrate peroxides are employed in the present invention, one skilled in the art would know that the concentrations suitable for pure peroxides are easily adjusted for concentrate peroxides by dividing by the activity. For example, 2 phr of a pure peroxide is equivalent 4 phr of a concentrate peroxide that is 50 percent active (i.e., 2 divided by 0.5=4).

In one embodiment, the amount of free radical source is about 5 phr or less, but also may be about 3 phr or less. In another embodiment, the amount of free radical source is about 2.5 phr or less. In yet another embodiment, the amount of free radical source is about 2 phr or less. In still another embodiment, the amount of free radical source is about 1 phr or less. In one embodiment, the free radical source is present in an amount of about 0.75 phr or less.

It should be understood by those of ordinary skill in the art that the presence of certain cis-to-trans catalysts according to the invention may require a larger amount of free-radical source, such as the amounts described herein, compared to conventional cross-linking reactions. The free radical source may alternatively or additionally be one or more of an electron beam, UV or gamma radiation, x-rays, or any other high energy radiation source capable of generating free radicals. It should be further understood that heat often facilitates initiation of the generation of free radicals.

In one embodiment, the ratio of the free radical source to the cis-to-trans catalyst is about 10 or less, but also may be about 5 or less. Additionally, the ratio of the free radical source to the cis-to-trans catalyst is about 4 or less, but also may be about 2 or less, and also may be about 1 or less. In another embodiment, the ratio of the free radical source to the cis-to-trans catalyst is about 0.5 or less, preferably about 0.4 or less. In yet another embodiment, the free radical source—cis-to-trans catalyst ratio is greater than 1.0. In still another embodiment, the free radical source—cis-to-trans catalyst is about 1.5 or greater. In another embodiment, the free radical source—cis-to-trans catalyst is about 1.75 or greater.

Crosslinking Agent(s)

Crosslinkers may be included to increase the hardness of the reaction product. Suitable crosslinking agents include one or more metallic salts of unsaturated fatty acids having 3 to 8 carbon atoms, such as acrylic or methacrylic acid, or monocarboxylic acids, such as zinc, calcium, or magnesium acrylate salts, and the like, and mixtures thereof. Examples include, but are not limited to, one or more metal salt diacrylates, dimethacrylates, and monomethacrylates, wherein the metal is magnesium, calcium, zinc, aluminum, sodium, lithium, or nickel. Preferred acrylates include zinc acrylate, zinc diacrylate, zinc methacrylate, zinc dimethacrylate, and mixtures thereof.

The crosslinking agent must be present in an amount sufficient to crosslink a portion of the chains of polymers in the resilient polymer component. For example, the desired compression may be obtained by adjusting the amount of crosslinking. This may be achieved, for example, by altering the type and amount of crosslinking agent, a method well-known to those of ordinary skill in the art. The crosslinking agent is typically present in an amount greater than about 0.1 percent of the polymer component, preferably from about 10 to 50 percent of the polymer component, more preferably from about 10 to 40 percent of the polymer component.

In one embodiment, the crosslinking agent is present in an amount greater than about 10 parts per hundred ("phr") parts of the base polymer, preferably from about 20 to about 40 phr of the base polymer, more preferably from about 25 to about 35 phr of the base polymer.

When an organosulfur is selected as the cis-to-trans catalyst, zinc diacrylate may be selected as the crosslinking agent and is present in an amount of less than about 25 phr.

Filler(s)

Fillers may be added to one or more portions of the golf ball. In one embodiment, at least one filler is added to the reaction product. Fillers typically include processing aids or compounds to affect Theological and mixing properties, the specific gravity (i.e., density-modifying fillers), the modulus, the tear strength, reinforcement, and the like. The fillers are generally inorganic, and suitable fillers include numerous metals, metal oxides and salts, such as zinc oxide and tin oxide, as well as barium sulfate, zinc sulfate, calcium carbonate, zinc carbonate, barium carbonate, clay, tungsten, tungsten carbide, an array of silicas, regrind (recycled core material typically ground to about 30 mesh particle), high-Mooney-viscosity rubber regrind, and mixtures thereof.

Fillers may also include various foaming agents or blowing agents which may be readily selected by one of ordinary skill in the art. Foamed polymer blends may be formed by blending blowing agent(s) with polymer material, as is well known by those of ordinary skill in the art. Polymeric, ceramic, metal, or glass microspheres, or combinations thereof, may be used to adjust the density or other properties of a given layer, and such microspheres may be solid or hollow, and filled or unfilled. Fillers are typically also added to one or more portions of the golf ball to modify the density thereof to conform to uniform golf ball standards. Fillers may also be used to modify the weight of the center or at least one additional layer for specialty balls, e.g., a lower weight ball is preferred for a player having a low swing speed.

Accelerator(s)

It is to be understood that when elemental sulfur or polymeric sulfur is included in the cis-to-trans catalyst, an accelerator may be used to improve the performance of the cis-to-trans catalyst. Suitable accelerators include, but are not limited to, sulfenamide, such as N-oxydiethylene 2-benzothiazole-sulfenamide, thiazole, such as benzothiazyl disulfide, dithiocarbamate, such as bismuth dimethyldithiocarbamate, thiuram, such as tetrabenzyl thiuram disulfide, xanthate, such as zinc isopropyl xanthate, thiadiazine, thiourea, such as trimethylthiourea, guanadine, such as N,N'-di-ortho-tolylguanadine, or aldehyde-amine, such as a butyraldehyde-aniline condensation product, or mixtures thereof.

Antioxidant

Typically, antioxidants are included in conventional golf ball core compositions because antioxidants are included in the materials supplied by manufacturers of compounds used in golf ball cores. Without being bound to any particular theory, higher amounts of antioxidant in the reaction product may result in less trans-isomer content because the antioxidants consume at least a portion of the free radical source. Thus, even with high amounts of the free radical source in the reaction product described previously, such as for example about 3 phr, an amount of antioxidant greater than about 0.3 phr may significantly reduce the effective amount of free radicals that are actually available to assist in a cis-to-trans conversion.

Because it is believed that the presence of antioxidants in the composition may inhibit the ability of free radicals to adequately assist in the cis-to-trans conversion, one way to ensure sufficient amounts of free radicals are provided for the conversion is to increase the initial levels of free radicals present in the composition so that sufficient amounts of free radicals remain after interaction with antioxidants in the composition. Thus, the initial amount of free radicals provided in the composition may be increased by at least about 10 percent, and more preferably are increased by at least about 25 percent so that the effective amount of remaining free radicals sufficient to adequately provide the desired cis-to-trans conversion. Depending on the amount of antioxidant present in the composition, the initial amount of free radicals may be increased by at least 50 percent, 100 percent, or an even greater amount as needed. As discussed below, selection of the amount of free radicals in the composition may be determined based on a desired ratio of free radicals to antioxidant.

Another approach is to reduce the levels of or eliminate antioxidants in the composition. For instance, the reaction product of the present invention may be substantially free of antioxidants, thereby achieving greater utilization of the free radicals toward the cis-to-trans conversion. As used herein, the term "substantially free" generally means that the polybutadiene reaction product includes less than about 0.3 phr of antioxidant, preferably less than about 0.1 phr of antioxidant, more preferably less than about 0.05 phr of antioxidant, and most preferably about 0.01 phr or less antioxidant.

The amount of antioxidant has been shown herein to have a relationship with the amount of trans-isomer content after conversion. For example, a polybutadiene reaction product with 0.5 phr of antioxidant cured at 335° F. for 11 minutes results in about 15 percent trans-isomer content at an exterior surface of the center and about 13.4 percent at an interior location after the conversion reaction. In contrast, the same polybutadiene reaction product substantially free of antioxidants results in about 32 percent trans-isomer content at an exterior surface and about 21.4 percent at an interior location after the conversion reaction.

In one embodiment, the ratio of the free radical source to antioxidant is greater than about 10. In another embodiment, the ratio of the free radical source to antioxidant is greater than about 25, preferably greater than about 50. In yet another embodiment, the free radical source-antioxidant ratio is about 100 or greater. In still another embodiment, the free radical source-antioxidant ratio is about 200 or greater, preferably 250 or greater, and more preferably about 300 or greater.

If the reaction product is substantially free of antioxidants, the amount of the free radical source is preferably about 3 phr or less. In one embodiment, the free radical source is present in an amount of about 2.5 phr or less, preferably about 2 phr or less. In yet another embodiment, the amount of the free radical source in the reaction product is about 1.5 phr or less, preferably about 1 phr or less. In still another embodiment, the free radical source is present is an amount of about 0.75 phr or less.

When the reaction product contains about 0.1 phr or greater antioxidant, the free radical source is preferably present in an amount of about 1 phr or greater. In one embodiment, when the reaction product is when the reaction product contains about 0.1 phr or greater antioxidant, the free radical source is present in an amount of about 2 phr or greater. In another embodiment, the free radical source is present in an amount of about 2.5 phr or greater when the antioxidant is present in an amount of about 0.1 phr or greater.

In one embodiment, when the reaction product contains greater than about 0.05 phr of antioxidant, the free radical source is preferably present in an amount of about 0.5 phr or greater. In another embodiment, when the reaction product has greater than about 0.05 phr of antioxidant, the free radical source is present in an amount of about 2 phr or greater. In yet another embodiment, the free radical source is present in an amount of about 2.5 phr or greater when the antioxidant is present in an amount of about 0.05 phr or greater.

Method

The invention also includes a method to convert the cis-isomer of the polybutadiene resilient polymer component to the trans-isomer during a molding cycle and to form a golf ball.

The resilient polymer component, additional polymers, free-radical initiator, filler(s), and any other materials used in forming either the golf ball center or any portion of the core, in accordance with invention, may be combined to form a mixture by any type of mixing known to one of ordinary skill in the art. As mentioned above, in one embodiment, this resilient polymer component is used to form the center. Suitable types of mixing include single pass and multi-pass mixing, and the like. The crosslinking agent, and any other optional additives used to modify the characteristics of the golf ball center or additional layer(s), may similarly be combined by any type of mixing. A single-pass mixing process where ingredients are added sequentially is preferred, as this type of mixing tends to increase efficiency and reduce costs for the process. The preferred mixing cycle is single step wherein the polymer, cis-to-trans catalyst, filler, zinc diacrylate, and peroxide are added sequentially. Suitable mixing equipment is well known to those of ordinary skill in the art, and such equipment may include a Banbury mixer, a two-roll mill, or a twin screw extruder.

Conventional mixing speeds for combining polymers are typically used, although the speed must be high enough to impart substantially uniform dispersion of the constituents. On the other hand, the speed should not be too high, as high mixing speeds tend to break down the polymers being mixed and particularly may undesirably decrease the molecular weight of the resilient polymer component. The speed should thus be low enough to avoid high shear, which may result in loss of desirably high molecular weight portions of the polymer component. Also, too high a mixing speed may undesirably result in creation of enough heat to initiate the crosslinking. The mixing temperature depends upon the type of polymer components, and more importantly, on the type of free-radical initiator. For example, when using di(2-t-butyl-peroxyisopropyl)benzene as the free-radical initiator, a mixing temperature of about 80° C. to 125° C., preferably about 88° C. to 110° C., and more preferably about 90° C. to 100° C., is suitable to safely mix the ingredients. Additionally, it is important to maintain a mixing temperature below the peroxide decomposition temperature. For example, if dicumyl peroxide is selected as the peroxide, the temperature should not exceed 93° C. Suitable mixing speeds and temperatures are well-known to those of ordinary skill in the art, or may be readily determined without undue experimentation.

The mixture can be subjected to, e.g., a compression or injection molding process, to obtain solid spheres for the center or hemispherical shells for forming an intermediate layer. The polymer mixture is subjected to a molding cycle in which heat and pressure are applied while the mixture is confined within a mold. The cavity shape depends on the portion of the golf ball being formed. The compression and heat liberates free radicals by decomposing one or more peroxides, which may initiate the cis-to-trans conversion and crosslinking simultaneously. The temperature and duration of the molding cycle are selected based upon the type of peroxide and cis-to-trans catalyst selected. The molding cycle may have a single step of molding the mixture at a single temperature for a fixed-time duration. Single-step processes are effective and efficient, reducing the time and cost of a two-step process. The molding cycle may also include a two-step process, in which the polymer mixture is held in the mold at an initial temperature for an initial duration of time, followed by holding at a second, typically higher temperature for a second duration of time.

In one embodiment, a single-step cure cycle is employed. Although the curing time depends on the various materials selected, a particularly suitable curing time is about 5 to 18 minutes, preferably from about 8 to 15 minutes, and more preferably from about 10 to 12 minutes. Those of ordinary skill in the art will be readily able to adjust the curing time upward or downward based on the particular materials used and the discussion herein. An example of a single step molding cycle, for a mixture that contains dicumyl peroxide, would hold the polymer mixture at 171° C. (340° F.) for a duration of 15 minutes.

In another embodiment, a two-step cure cycle is used to form the reaction product. An example of a two-step molding cycle would be holding the mold at 143° C. (290° F.) for 40 minutes, then ramping the mold to 171° C. (340° F.) where it is held for a duration of 20 minutes.

The cured polymer component in the center, which contains a greater amount of trans-isomer polybutadiene than the uncured polymer component, is formed into a component with a first hardness at a first point and a second hardness at a second point. In one embodiment, the second hardness is at least about 10 percent greater than the first hardness. In another embodiment, the second hardness is at least about 20 percent greater than the first hardness.

In another embodiment, the cured component has a first amount of trans-isomer polybutadiene at a first, interior point, e.g., the geometric center of the golf ball, and a second amount of trans-isomer polybutadiene at a second point located closer to the surface of the golf ball center, wherein the first amount is at least about 6 percent less than the second amount, preferably at least about 10 percent less than the second amount, and more preferably at least about 20 percent less than the second amount.

It should be understood by those of ordinary skill in the art that the polybutadiene reaction product can be blended with at least a second polymer component to form the center of the golf ball. In one preferred embodiment, the polybutadiene reaction product can be used to form the center and a second, different polymer component will be combined with a reinforcing polymer component to form at least one intermediate layer. This last embodiment is discussed in greater detail below.

Measurement of Trans-Isomer Content

The measurement of trans-isomer content of polybutadiene referred to herein was and can be accomplished as follows. Calibration standards are prepared using at least two polybutadiene rubber samples of known trans-content, e.g., high and low percent trans-isomer polybutadiene. These samples are used alone and blended together in such a way as to create a ladder of trans-isomer polybutadiene content of at least about 1.5 percent to 50 percent or to bracket the unknown amount, such that the resulting calibration curve contains at least about 13 equally spaced points.

Using a commercially available Fourier Transform—Infrared (FT-IR) spectrometer equipped with a Photoacoustic (PAS) cell, a PAS spectrum of each standard was obtained using the following instrument parameters: scan at speed of 2.5 KHz (0.16 cm/sec optical velocity), use a 1.2 KHz electronic filter, set an undersampling ratio of 2 (number of laser signal zero crossings before collecting a sample), co-add a minimum of 128 scans at a resolution of 4 cm$^{-1}$ over a range of 375 to 4000 cm$^{-1}$ with a sensitivity setting of 1.

The cis-, trans-, and vinyl-isomer polybutadiene peaks found between 600 and 1100 cm$^{-1}$ from the PAS spectra can be integrated. The area under the trans-isomer polybutadiene peaks as a fraction of the total area under the three isomer peaks can then be determined to construct a calibration curve of the trans-isomer polybutadiene area fraction versus the actual trans-isomer polybutadiene content. The correlation coefficient ($R^2$) of the resulting calibration curve must be a minimum of 0.95.

A PAS spectrum is obtained using the parameters described above for the unknown core material at the point of interest (e.g., the surface or geometric center of the core) by filling the PAS cell with a sample containing a freshly cut, uncontaminated surface free of foreign matters such as mold release and the like. The trans-isomer polybutadiene area fraction of the unknown is analyzed to determine the actual trans-isomer content from the calibration curve. An increase in the trans-content anywhere in the article being manufactured or tested should be understood herein to refer to the trans- at any point in the article.

In one known circumstance when barium sulfate is included, the above method for testing trans-content may be less accurate. Thus, an additional or alternative test of the trans-content of polybutadiene is as follows. Calibration standards are prepared using at least two polybutadienes of known trans-content (e.g., high and low percent trans-isomer polybutadiene). These samples are used alone and blended together in such a way as to create a ladder of trans-isomer content of at least about 1.5 percent to 50 percent or to bracket the unknown amount, such that the resulting calibration curve contains at least about 13 equally spaced points.

Using a Fourier Transform—Raman (FT-Raman) spectrometer equipped with a near-infrared laser, a Stokes Raman spectrum should be obtained from each standard using the following instrument parameters: sufficient laser power to obtain a good signal to noise ratio without causing excessive heating or fluorescence (typically about 400 to 800 mW is suitable); a resolution of 2 cm$^{-1}$; over a Raman shift spectral range of about 400 to 4000 cm$^{-1}$; and co-adding at least 300 scans.

A calibration curve may be constructed from the data generated above, using a chemometrics approach and software such as PLSplus/IQ from Galactic Industries Corp. of Salem, N.H. An acceptable calibration was obtained with this software using a PLS-1 curve generated using an SNV (detrend) pathlength correction, a mean center data preparation, and a 5-point SG second derivative over the spectral range from about 1600 to 1700 cm$^{-1}$. The correlation coefficient ($R^2$) of the resulting calibration curve must be a minimum of 0.95.

A Raman spectrum of the unknown core material is obtained using this instrument at the point of interest in the unknown sample (e.g., surface or geometric center of the golf ball core). The unknown must be free of foreign matter, such as mold release, etc. Analyze the spectrum of the unknown using the PLS calibration curve to determine trans-isomer content of the unknown sample.

In one embodiment, the amount of trans-isomer content after conversion is at least about 10 percent or greater, while in another it is about 12 percent or greater. In another embodiment, the amount of trans-isomer content is about 15 percent or greater after conversion. In yet another embodiment, the amount of trans-isomer content after conversion is about 20 percent or greater, and more preferably is about 25 percent or greater. In still another embodiment, the amount of trans-isomer content after conversion is about 30 percent or greater, and preferably is about 32 percent or greater. The amount of trans-isomer after conversion also may be about 35 percent or greater, about 38 percent or greater, or even about 40 percent or greater. In yet another embodiment, the amount of trans-isomer after conversion may be about 42 percent or greater, or even about 45 percent or greater.

The cured portion of the component including the reaction product of the invention may have a first amount of trans-isomer polybutadiene at an interior location and a second amount of trans-isomer polybutadiene at an exterior surface location. In one embodiment, the amount of trans-isomer at the exterior surface location is greater than the amount of trans-isomer at an interior location. For example, in one embodiment of the invention, the polybutadiene reaction product may contain between about 35 percent to 60 percent of the trans-isomer at the exterior surface of a center portion. Another embodiment has from about 40 percent to 50 percent of trans-isomer at the exterior surface of a center portion. In one embodiment, the reaction product contains about 45 percent trans-isomer polybutadiene at the exterior surface of a center portion. The reaction product at the center of the solid center portion may then contain at least about 20 percent less trans-isomer, at least about 30 percent less trans-isomer, or at least about 40 percent less trans-isomer, than is present at the exterior surface of the same center portion.

In other words, in one embodiment, the interior location has no more than about 80 percent of the trans-polybutadiene content at the exterior surface location. In another embodiment, the interior location has no more than about 70 percent of the trans-polybutadiene content at the exterior surface location. In yet another embodiment, the interior location has no more than about 60 percent of the trans-polybutadiene content at the exterior surface location.

The exterior portion of the center may have amounts of trans-isomer after conversion in the amounts already indicated previously herein, such as in amounts about 10 percent or greater, about 12 percent or greater, about 15 percent or greater, and the like, up to and including amounts that are about 45 percent or greater as stated above.

In some instances, the interior portion of the center may have lower amounts of trans-isomer than the exterior portion. For instance, the interior portion of the center may have about 5 percent trans-isomer after conversion. However, the interior portion of the center also may have amounts of trans-isomer after conversion in the amounts already indicated previously herein, such as in amounts about 10 percent or greater, about 12 percent or greater, about 15 percent or greater, and the like, up to and including amounts that are about 45 percent or greater as stated above.

The difference in the amounts of trans-isomer content after conversion between the interior portion of the center and the exterior portion may be varied to have an increasing or decreasing gradient of the amount of trans-isomer present from the interior portion to the exterior portion of the center. In one embodiment, the difference in trans-isomer content between the exterior and the interior after conversion is about 3 percent or greater, while in another embodiment the difference may be about 5 percent or greater. In another embodiment, the difference in trans-isomer content between the exterior surface and the interior location after conversion is about 10 percent or greater, and more preferably is about 20 percent or greater. While it is preferred that the differences in amounts of trans-isomer from the interior to the exterior portion of the center may be such that the exterior portion has greater amounts of trans-isomer, it is also possible that these differences can reflect a center with greater amounts of trans-isomer at the interior portion than at the exterior portion.

As will be further illustrated by the examples provided herein, the difference in trans-isomer content between the exterior surface and the interior location after conversion may differ depending on the cure cycle and the ratios of materials used for the conversion reaction. For example, when the ratio of peroxide to cis-to-trans catalyst is about 1.0 or less, the exterior surface trans-isomer content may be less than when the peroxide-catalyst ratio is greater than about 1.0.

This invention also contemplates low trans-isomer content gradients. Thus, the difference in trans-isomer content between the exterior surface and the interior location after conversion may be about 5 percent or less. In one embodiment, the difference in trans-isomer content between the exterior surface and the interior location after conversion is about 4 percent or less. In another embodiment, the difference in trans-isomer content between the exterior surface and the interior location after conversion is about 3 percent or less, while in yet another embodiment the difference is about 1 percent or less.

Hardness

The hardness differences discussed in this section are generally meant to refer to the golf ball component that contains the reaction product. The difference in the hardness between two points on a center portion or on an intermediate layer may be expressed as a gradient. If the hardness measured at one point differs from the hardness measured at another point, the component, either a center portion or an intermediate layer, can be said to contain a hardness gradient.

It should be understood, especially to one of ordinary skill in the art, that there is a fundamental difference between "material hardness" and "hardness, as measured directly on a golf ball." Material hardness is defined by the procedure set forth in ASTM-D2240 and generally involves measuring the hardness of a flat "slab" or "button" formed of the material of which the hardness is to be measured. Hardness, when measured directly on a golf ball (or other spherical surface) is a completely different measurement and, therefore, results in a different hardness value. This difference results from a number of factors including, but not limited to, ball construction (i.e.; core type, number of core and/or cover layers, etc.), ball (or sphere) diameter, and the material composition of adjacent layers. It should also be understood that the two measurement techniques are not linearly related and, therefore, one hardness value cannot easily be correlated to the other.

The component including the reaction product of the invention may have a first hardness at an interior location and a second hardness at an exterior surface location as measured on a molded sphere. In one embodiment, the first amount is at least about 6 percent less than the second amount, preferably at least about 10 percent less than the second amount, and more preferably at least about 20 percent less than the second amount. In another embodiment, the center has a first point, typically near the geometric center of the golf ball center, with a first hardness, and a second point, typically near the surface of the golf ball center, with a second hardness, wherein the second hardness is at least about 10 percent greater than the first hardness. In other embodiments, the second hardness is at least about 20 percent greater or at least about 30 percent greater, than the first hardness.

For example, a reaction product of this invention shaped into a portion of a golf ball may have a hardness at one point of about 45 Shore C to about 60 Shore C and a hardness at a second point of about 65 Shore C to about 75 Shore C. In one golf ball formulated according to the invention, the hardness was about 51 Shore C at one point in the core and about 71 Shore C at a second point, providing a hardness difference of greater than 20 percent.

The golf ball polybutadiene material in the center typically has a hardness of at least about 15 Shore A, preferably between about 30 Shore A and 80 Shore D, more preferably between about 50 Shore A and 60 Shore D. The specific gravity is typically greater than about 0.7, preferably greater than about 1, for the golf ball polybutadiene material.

Other Properties

The golf ball polybutadiene material of the present invention typically has a flexural modulus of from about 500 psi to 300,000 psi, preferably from about 2000 to 200,000 psi.

The molding process and composition of golf ball portions typically results in a gradient of material properties. Methods employed in the prior art generally exploit hardness to quantify these gradients, however, hardness is a qualitative measure of static modulus and does not represent the modulus of the material at the deformation rates associated with golf ball use, i.e., impact by a club. As is well known to one skilled in the art of polymer science, the time-temperature superposition principle may be used to emulate alternative deformation rates. For golf ball portions including polybutadiene, a 1-Hz oscillation at temperatures between 0° C. and –50° C. are believed to be qualitatively equivalent to golf ball impact rates. Therefore, measurement of loss tangent and dynamic stiffness at 0° C. to –50° C. may be used to accurately anticipate golf ball performance.

Depending on the desired properties, balls prepared according to the invention can exhibit substantially the same or higher resilience, or coefficient of restitution (COR), with a decrease in compression or modulus, compared to balls of conventional construction. Additionally, balls prepared according to the invention can also exhibit substantially higher resilience, or coefficient of restitution (COR), without an increase in compression, compared to balls of conventional construction. Without wishing to be bound by any particular theory, it is also believed that the resulting mobility of the combined cis- and trans-isomer polybutadiene backbone is responsible for the lower modulus and higher resilience of the reaction product and golf balls including the same.

Another measure of this resilience is the "loss tangent," or tan δ, which is obtained when measuring the dynamic mechanical properties of an object. As used herein, the term "loss tangent," or tan δ, is defined as unrecoverable energy divided by recoverable energy, where the energy of deflection is measured at the operating criteria specified herein for dynamic stiffness.

Loss tangent and a variety of other dynamic properties may be measured according to ASTM D4065-90, and terminology relating to such dynamic properties is typically described according to ASTM D4092-90. Low loss tangent indicates higher rebound capacity, since most of the energy imparted to a golf ball from the club is converted to dynamic energy, i.e., launch velocity and resulting longer distance. The desired loss tangent in the crosslinked intermediate layer material should be less than about 0.15 at −60° C. and less than about 0.05 at 30° C. when measured at a frequency of 1 Hz and a one percent strain.

The rigidity or compressive stiffness of a golf ball may be measured, for example, by the dynamic stiffness. A higher dynamic stiffness indicates a higher compressive stiffness. As used herein, the term "dynamic stiffness" is defined as load divided by the deflection for a 1.4-mm spherical radius penetration probe oscillating at 1 Hz with an amplitude of 100 $\mu$m. The probe dynamically penetrates the surface of a sample material. Material samples of spherical cores were prepared by sectioning out a 6-mm-thick layer along the equator of core to produce a disk 6 mm thick with one surface containing the geometric center of the core. By positioning the probe at any selected radial position on the disk, a dynamic stiffness measurement may be obtained. Accurate dynamic measurements may be made by keeping the material sample at a substantially uniform temperature.

To produce golf balls having a desirable compressive stiffness, the dynamic stiffness of the crosslinked reaction product material should be less than about 50,000 N/m at −50° C. Preferably, the dynamic stiffness should be between about 10,000 and 40,000 N/m at −50° C., more preferably, the dynamic stiffness should be between about 20,000 and 30,000 N/m at −50° C.

The dynamic stiffness is similar in some ways to dynamic modulus. Dynamic stiffness is dependent on probe geometry as described herein, whereas dynamic modulus is a unique material property, independent of geometry. The dynamic stiffness measurement has the unique attribute of enabling exact measurement of loss tangent at discrete points within a sample component. The polybutadiene reaction product in the center preferably has a loss tangent below about 0.1 at −50° C., and more preferably below about 0.07 at −50° C.

In one embodiment, the reaction product has a first dynamic stiffness measured at −50° C. that is less than about 130 percent of a second dynamic stiffness measured at 0° C. In another embodiment, the first dynamic stiffness is less than about 125 percent of the second dynamic stiffness. In yet another embodiment, the first dynamic stiffness is less than about 110 percent of the second dynamic stiffness.

In one embodiment, the center composition includes at least one rubber material having a resilience index of at least about 40. In another embodiment, the resilience index of the at least one rubber material is at least about 50. A comparison of a number of polybutadiene polymers are listed in Table 1 below. Suitable resilient-golf ball producing polymers include, but are not limited to, CB23, CB22, BR60, and 1207G. To clarify the method of computation for resilience index, the resilience index for CB23, for example, is computed as follows:

Resilience Index for $CB23 = 100{,}000 \cdot [(0.954) - (0.407)]/990$

Resilience Index for $CB23 = 55$

TABLE 1

Resilience Index of example polybutadiene polymers

| Rubber | Tan δ at 10 cpm | Tan δ at 1000 cpm | Resilience Index at 100° C. |
|---|---|---|---|
| CB23 | 0.954 | 0.407 | 55 |
| CB22 | 0.895 | 0.358 | 54 |
| BR-60 | 0.749 | 0.350 | 40 |
| BR-40 | 0.841 | 0.446 | 40 |

TABLE 1-continued

Resilience Index of example polybutadiene polymers

| Rubber | Tan δ at 10 cpm | Tan δ at 1000 cpm | Resilience Index at 100° C. |
|---|---|---|---|
| Taktene 8855 | 0.720 | 0.414 | 31 |
| CARIFLEX BR1220 | 0.487 | 0.439 | 5 |
| BUDENE 1207G | 0.825 | 0.388 | 44 |

Intermediate Layer(s) Compositions

When the golf ball of the present invention includes an intermediate layer, such as an inner cover layer or outer core layer, this layer can include any materials known to those of ordinary skill in the art including thermoplastic and thermosetting materials, but preferably the intermediate layer can include any suitable materials, such as ionic copolymers of ethylene and an unsaturated monocarboxylic acid which are available under the trademark SURLYN of E. I. DuPont de Nemours & Co., of Wilmington, Del., or IOTEK or ESCOR of Exxon. These are copolymers or terpolymers of ethylene and methacrylic acid or acrylic acid partially neutralized with salts of zinc, sodium, lithium, magnesium, potassium, calcium, manganese, nickel or the like, in which the salts are the reaction product of an olefin having from 2 to 8 carbon atoms and an unsaturated monocarboxylic acid having 3 to 8 carbon atoms. The carboxylic acid groups of the copolymer may be totally or partially neutralized and might include methacrylic, crotonic, maleic, fumaric or itaconic acid.

The intermediate layer may also likewise include one or more homopolymeric or copolymeric materials, such as:
(1) Vinyl resins, such as those formed by the polymerization of vinyl chloride, or by the copolymerization of vinyl chloride with vinyl acetate, acrylic esters or vinylidene chloride;
(2) Polyolefins, such as polyethylene, polypropylene, polybutylene and copolymers such as ethylene methylacrylate, ethylene ethylacrylate, ethylene vinyl acetate, ethylene methacrylic or ethylene acrylic acid or propylene acrylic acid and copolymers and homopolymers produced using a single-site catalyst or a metallocene catalyst;
(3) Polyurethanes, such as those prepared from polyols and diisocyanates or polyisocyanates and those disclosed in U.S. Pat. No. 5,334,673;
(4) Polyureas, such as those disclosed in U.S. Pat. No. 5,484,870;
(5) Polyamides, such as poly(hexamethylene adipamide) and others prepared from diamines and dibasic acids, as well as those from amino acids such as poly(caprolactam), and blends of polyamides with SURLYN, polyethylene, ethylene copolymers, ethyl-propylene-non-conjugated diene terpolymer, and the like;
(6) Acrylic resins and blends of these resins with poly vinyl chloride, elastomers, and the like;
(7) Thermoplastics, such as urethanes; olefinic thermoplastic rubbers, such as blends of polyolefins with ethylene-propylene-non-conjugated diene terpolymer; block copolymers of styrene and butadiene, isoprene or ethylene-butylene rubber; or copoly(ether-amide), such as PEBAX, sold by ELF Atochem of Philadelphia, Pa.;
(8) Polyphenylene oxide resins or blends of polyphenylene oxide with high impact polystyrene as sold under the trademark NORYL by General Electric Company of Pittsfield, Mass.;

(9) Thermoplastic polyesters, such as polyethylene terephthalate, polybutylene terephthalate, polyethylene terephthalate/glycol modified and elastomers sold under the trademarks HYTREL by E. I. DuPont de Nemours & Co. of Wilmington, Del., and LQMOD by General Electric Company of Pittsfield, Mass.;

(10) Blends and alloys, including polycarbonate with acrylonitrile butadiene styrene, polybutylene terephthalate, polyethylene terephthalate, styrene maleic anhydride, polyethylene, elastomers, and the like, and polyvinyl chloride with acrylonitrile butadiene styrene or ethylene vinyl acetate or other elastomers; and

(11) Blends of thermoplastic rubbers with polyethylene, propylene, polyacetal, nylon, polyesters, cellulose esters, and the like.

In one embodiment, the intermediate layer includes polymers, such as ethylene, propylene, butene-1 or hexane-1 based homopolymers or copolymers including functional monomers, such as acrylic and methacrylic acid and fully or partially neutralized ionomer resins and their blends, methyl acrylate, methyl methacrylate homopolymers and copolymers, imidized, amino group containing polymers, polycarbonate, reinforced polyamides, polyphenylene oxide, high impact polystyrene, polyether ketone, polysulfone, poly (phenylene sulfide), acrylonitrile-butadiene, acrylic-styrene-acrylonitrile, poly(ethylene terephthalate), poly(butylene terephthalate), poly(ethelyne vinyl alcohol), poly(tetrafluoroethylene) and their copolymers including functional comonomers, and blends thereof.

Suitable intermediate layer compositions also include a polyether or polyester thermoplastic urethane, a thermoset polyurethane, a low modulus ionomer, such as acid-containing ethylene copolymer ionomers, including E/X/Y terpolymers where E is ethylene, X is an acrylate or methacrylate-based softening comonomer present in about 0 to 50 weight percent and Y is acrylic or methacrylic acid present in about 5 to 35 weight percent. More preferably, in a low spin rate embodiment designed for maximum distance, the acrylic or methacrylic acid is present in about 15 to about 35 weight percent, making the ionomer a high modulus ionomer. In a high spin embodiment, the intermediate layer includes an ionomer where an acid is present in about 10 to 15 weight percent and includes a softening comonomer. In another embodiment, the acrylic or methacrylic acid is present in about 8 to 35 weight percent, more preferably 8 to 25 weight percent, and most preferably 8 to 20 weight percent.

In one embodiment, the intermediate layer includes a resilient polymer component, which is preferably used as the majority of polymer in the intermediate layer.

Resilient Polymer Component

Resilient polymers suitable for use in the ball core include polybutadiene, polyisoprene, styrene-butadiene, styrene-propylene-diene rubber, ethylene-propylene-diene (EPDM), mixtures thereof, and the like. The resilient polymer component is preferably a conventional cis-polyisoprene or a polybutadiene ("BR") component, more preferably polybutadiene, and most preferably a 1,4-cis-polybutadiene. One example of a 1,4-cis-polybutadiene is CARIFLEX BR 1220, commercially available from H. MUEHLSTEIN & CO., INC. of Norwalk, Conn.

When a conventional cis-polybutadiene or other resilient polymer component is used to form an intermediate layer, it may be produced with any suitable catalyst that results in a predominantly 1,4-cis content, and preferably with a catalyst that provides a high 1,4-cis content and a high molecular weight average.

The resilient polymer component has a high molecular weight average, defined as being at least about 50,000 to 1,000,000, preferably from about 250,000 to 750,000, and more preferably from about 200,000 to 400,000. CARIFLEX BR 1220 has a molecular weight average of about 372,000.

The 1,4-cis component of polybutadiene is generally the predominant portion of the resilient polymer component when polybutadiene is present. "Predominant" or "predominantly" is used herein to mean greater than 50 weight percent. The 1,4-cis component is preferably greater than about 90 weight percent, and more preferably greater than about 95 weight percent, of the polybutadiene component. The resilient polymer component is typically present in an amount of at least about 60 weight percent, preferably about 65 to 99 weight percent, and more preferably about 75 to 90 weight percent of the polymer blend. The term "polymer blend," when referring to the intermediate layer, is generally used herein to mean the blend of the resilient polymer component and the reinforcing polymer component. The resilient polymer component imparts resilience in the cured, or crosslinked, state.

Reinforcing Polymer Component

The intermediate layer may also include a reinforcing polymer component, which contains at least one polymer having a glass transition temperature ($T_G$) sufficiently low to permit combination and mixing of the reinforcing polymer component with the resilient polymer component without initiating crosslinking of the crosslinking agent that is also typically present in the mixture, as described herein. The reinforcing polymer component preferably has a sufficiently low viscosity at the mixing temperature when mixed with the resilient polymer component to permit proper mixing of the two polymer components, i.e., the resilient polymer component and the reinforcing polymer component.

The reinforcing polymer component may also have a glass transition temperature (and if crystalline, a crystalline melting point) sufficiently low to permit mixing with the resilient polymer component while avoiding substantial crosslinking or thermal degradation of the resilient component at the mixing temperature. The crystalline melting temperature is typically between about 35° C. to 120° C. Examples of polymers suitable for use in the reinforcing polymer component include: trans-polyisoprene, block copolymer ether/ester, acrylic polyol, a polyethylene, a polyethylene copolymer, 1,2-polybutadiene (syndiotactic), ethylene-vinyl acetate copolymer, trans-polycyclooctenenamer, trans-isomer polybutadiene, and mixtures thereof. Particularly suitable reinforcing polymers include: HYTREL 3078, a block copolymer ether/ester commercially available from DuPont of Wilmington, Del.; a trans-isomer polybutadiene, such as FUREN 88 obtained from Asahi Chemicals of Yako, Kawasakiku, Kawasakishi, Japan; KURRARAY TP251, a trans-polyisoprene commercially available from KURRARAY CO.; LEVAPREN 700HV, an ethylene-vinyl acetate copolymer commercially available from Bayer-Rubber Division, Akron, Ohio; and VESTENAMER 8012, a trans-polycyclooctenenamer commercially available from Huls America Inc. of Tallmadge, Ohio. Some suitable reinforcing polymer components are listed below with their crystalline melt temperature ($T_C$) and/or $T_G$.

| Polymer Type | Tradename | $T_C$ (° C.) | $T_G$ (° C.) |
|---|---|---|---|
| Trans-polyisoprene | KURRARAY TP251 | 60 | −59 |
| Trans-polybutadiene | FUREN 88 | 84 | −88 |
| Polyethylene | Dow LPDE | 98 | −25 |
| Trans-polycyclo octenenamer | VESTENAMER 8012 | 54 | −65 |

Another polymer particularly suitable for use in the reinforcing polymer component is a rigidifying polybutadiene component, which typically includes at least about 80 percent trans-isomer content with the rest being cis-isomer 1,4-polybutadiene and vinyl-isomer 1,2-polybutadiene. Thus, it may be referred to herein as a "high trans-isomer polybutadiene" or a "rigidifying polybutadiene" to distinguish it from the conventional cis-isomer polybutadienes or polybutadienes having a low trans-isomer content, i.e., typically below 80 percent, which are often used in forming golf ball cores and often used in the resilient polymer components discussed herein. Typically, the vinyl-content of the rigidifying polybutadiene component is present in no more than about 15 percent, preferably less than about 10 percent, more preferably less than about 5 percent, and most preferably less than about 3 percent of the polybutadiene isomers, with decreasing amounts being preferred. Without being bound by any particular theory, it is believed that decreasing the vinyl-polybutadiene content increases resilience of the polymer and the material formed therewith.

The rigidifying polybutadiene component, when used in a golf ball of the invention, preferably has a polydispersity of no greater than about 4, preferably no greater than about 3, and more preferably no greater than about 2.5. The polydispersity, or PDI, is a ratio of the molecular weight average ($M_w$) over the molecular number average ($M_n$) of a polymer.

In addition, the rigidifying polybutadiene component, when used in a golf ball of the invention, typically has a high absolute molecular weight average, defined as being at least about 100,000, preferably from about 200,000 to 1,000,000. In one embodiment, the absolute molecular weight average is from about 230,000 to 750,000. In another embodiment, the molecular weight is about 275,000 to 700,000. In any embodiment where the vinyl-content is present in greater than about 10 percent, the absolute molecular weight average is preferably greater than about 200,000.

When included in the at least one intermediate layer as part or all of the reinforcing polymer component, the rigidifying polybutadiene component of the invention may be produced by any means available to those of ordinary skill in the art, preferably with a catalyst that results in a rigidifying polybutadiene having at least 80 percent trans-content and a high absolute molecular weight average. A variety of literature is available to guide one of ordinary skill in the art in preparing suitable polybutadiene components for use in the invention, including U.S. Pat. Nos. 3,896,102; 3,926,933; 4,020,007; 4,020,008; 4,020,115; 4,931,376; and 6,018,007, each of which is hereby incorporated herein by express reference thereto.

Unless another rigidifying method is used, the reinforcing polymer component should be present in an amount sufficient to impart rigidity to the shells during processing, yet not undesirably reduce resilience of the crosslinked polymer blend and thereby have an undesirable effect on the final product. Also, the reinforcing polymer component, i.e., the additive polymer component, must have a viscosity sufficiently low to permit mixing of the reinforcing polymer component and the resilient polymer component. For example, trans-polyisoprene is the preferred reinforcing polymer component and has a viscosity of less than 1,000,000 poise at a mixing temperature of around 82° C. The viscosity of materials suitable for use in the invention may be readily determined by one of ordinary skill in the art. The viscosity should generally be below about 1,000,000 poise to readily permit mixing.

When trans-polyisoprene or high trans-isomer polybutadiene is included in the reinforcing polymer component, it may be present in an amount of about 10 to 40 weight percent, preferably about 15 to 30 weight percent, more preferably about 15 to no more than 25 weight percent of the polymer blend, i.e., the resilient and reinforcing polymer components.

The weight of the reinforcing polymer relative to the total composition for forming the intermediate layer generally ranges from about 5 to 25 weight percent, preferably about 10 to 20 weight percent. The uncrosslinked intermediate layer should have a flexural modulus, as measured under ASTM D790M-93, Method II, of greater than about 3.5 MPa, and preferably greater than about 7 MPa. The reinforcing polymer component(s) imparts a degree of rigidity to the shells sufficient to maintain the desired shape until the first mixture is crosslinked.

Crosslinking Agent(s)

The desired elastic modulus for the intermediate may be obtained by adjusting the amount of crosslinking by selecting a particular type or amount of crosslinking agent. This may be achieved, for example, by altering the type and amount of crosslinking agent, which method is well known to those of ordinary skill in the art. The same crosslinking agents mentioned above may be used in this embodiment for preparing the intermediate layer. In one embodiment, the crosslinking agent is added in an amount from about 1 to 50 parts per hundred of the polymer blend, preferably about 20 to 45 parts per hundred, and more preferably about 30 to 40 parts per hundred, of the polymer blend.

Method

The resilient polymer component, reinforcing polymer component, free-radical initiator, and any other materials used in forming an intermediate layer of a golf ball core in accordance with invention may be combined by any type of mixing known to one of ordinary skill in the art. A suitable system, for example, would include trans-polyisoprene, which melts at around 60° C., as the reinforcing component and a dicumyl peroxide, which substantially initiates reaction at around 170° C., as the free radical initiator. Suitable types of mixing include single pass and multi-pass mixing, and the like. The optional crosslinking agent, and any other optional additives used to modify the characteristics of the golf ball center, may similarly be combined by any type of mixing. A single-pass mixing process where ingredients are added sequentially is preferred, as this type of mixing tends to increase efficiency and reduce costs for the process. Suitable mixing equipment is well known to those of ordinary skill in the art, and such equipment may include a Banbury mixer or a twin screw extruder. Conventional mixing speeds for combining polymers are typically used, although the speed must be high enough to impart substantially uniform dispersion of the resilient and reinforcing polymer components. On the other hand, the speed should not be too high, as high mixing speeds tend to break down the polymers being mixed and particularly may undesirably decrease the molecular weight of the resilient polymer component. The speed should thus be low enough to avoid high shear, which may result in loss of desirably high molecular weight portions of the resilient polymer component. Also, too high a mixing speed may undesirably result in creation of enough heat to initiate the crosslinking before the preforms are shaped and assembled around a core. The mixing temperature depends upon the type of resilient and reinforcing polymer components, and more importantly, on the type of free-radical initiator. The mixing temperature must be higher-than the melting temperature of the reinforcing polymer component, but not so high as to initiate substantial crosslinking. For example, when using di(2-t-butyl-peroxyisopropyl)benzene peroxide as the free-radical initiator, a mixing temperature of about 80° C. to 125° C., preferably about 88° C. to 110° C, and more preferably about 90° C. to 100° C. is suitable to safely mix the ingredients. The mixing speed and temperature are readily determinable by one of ordinary skill in the art without undue experimentation.

In this embodiment, the preforms can then be prepared by mixing the resilient polymer component, the reinforcing polymer component, and any other ingredients together as discussed above. The resulting geometrical stability provides additional time for processing between preform formation and curing via compression molding. This additional time may be used to improve manufacturability, optimize production scheduling, and the like, such as by preparation and stockpiling of rigid shells to facilitate molding machine shut down for maintenance or tool changes. With enough shells stockpiled, further golf ball manufacture could be carried out even while the preform injection machine is being retooled. The mixture of polymer components, free-radical initiator, optionally a crosslinking agent, and any fillers may be extruded or pelletized for introduction into a molding machine for preparation of the intermediate layer.

The half-shells, typically hemispherical or ellipsoidal in shape, may be injection molded from the mixture based on cost and speed considerations, although compression or other types of molding could also be suitable. The mold is preferably maintained at a temperature below the crystalline melting temperature of the reinforced polymer component to inhibit the formed shells from altering shape due to the memory of the resilient polymer component.

After their formation, the half-shells are assembled about the center to form the core. In accordance with the invention, the shells may be produced rapidly, for example, with injection molding. The rapid production of shells permits use of automated procedures for assembly about the center. During assembly about the center, the half-shells, particularly when ellipsoidally shaped, may self-orient themselves vertically when placed in hemispherical mold cups, which reduces preparation time, cost, and defects. The ellipsoidal-shaped half-shells inhibit formation of air cavities at the apex due to their having more material at the crown of the shell, thereby facilitating the expulsion of any trapped air out of the mold at the equator of the core where the two mold halves are typically combined for the molding of the intermediate layer about the center. The assembly of the core, i.e., typically two half-shell preforms and a center, may be compression molded. When the mold halves are combined, they form a rigid, spherical cavity. Once the mold is closed, the excess material from the shell crowns is forced out of the mold cavity at the equator where the mold halves combine. The compression molding of the assembled preforms and center tends to take about 5 to 40 minutes, although times may vary depending upon the materials used. For example, a typical compression molding cycle may take 12 minutes at around 174° C. The shells are forced together by the mold and substantially cured during molding. Optionally, if additional intermediate layers are desired, e.g., having different characteristics to improve or modify the overall ball qualities, they may be provided over the first intermediate layer. Additional intermediate layers are preferably added after the previous intermediate layer is cured, although they may be added before cure of the previous layer if the pre-cured intermediate layer is rigid enough so that substantially no mixing of the layers occurs. Balls prepared according to the invention with a reinforcing polymer component in the intermediate layer tend to exhibit substantially the same resilience, or coefficient of restitution, as balls with conventional intermediate layers.

Cover Compositions

The cover provides the interface between the ball and a club. Properties that are desirable for the cover are good moldability, high abrasion resistance, high tear strength, high resilience, and good mold release, among others.

The cover can include any suitable cover or intermediate layer materials, known to those of ordinary skill in the art, including thermoplastic and thermosetting materials, but preferably the cover or intermediate layer can include any suitable materials, such as ionic copolymers of ethylene and an unsaturated monocarboxylic acid which are available under the trademark SURLYN of E. I. DuPont de Nemours & Co., of Wilmington, Del., or IOTEK or ESCOR of Exxon. These are copolymers or terpolymers of ethylene and methacrylic acid or acrylic acid partially neutralized with salts of zinc, sodium, lithium, magnesium, potassium, calcium, manganese, nickel or the like, in which the salts are the reaction product of an olefin polymer having from 2 to 8 carbon atoms as a repeating unit and an unsaturated mono- or di-carboxylic acid having 3 to 8 carbon atoms as a repeating unit. The carboxylic acid groups of the copolymer may be totally or partially neutralized and might include methacrylic, crotonic, maleic, fumaric or itaconic acid.

The cover may also include one or more homopolymeric or copolymeric materials, such as:

(1) Vinyl resins, such as those formed by the polymerization of vinyl chloride, or by the copolymerization of vinyl chloride with vinyl acetate, acrylic esters or vinylidene chloride;

(2) Polyolefins, such as polyethylene, polypropylene, polybutylene and copolymers such as ethylene methylacrylate, ethylene ethylacrylate, ethylene vinyl acetate, ethylene methacrylic or ethylene acrylic acid or propylene acrylic acid and copolymers and homopolymers produced using a single-site catalyst;

(3) Polyurethanes, such as those prepared from polyols or amines and diisocyanates or polyisocyanates and those disclosed in U.S. Pat. No. 5,334,673;

(4) Polyureas, such as those disclosed in U.S. Pat. No. 5,484,870;

(5) Polyamides, such as poly(hexamethylene adipamide) and others prepared from diamines and dibasic acids, as well as those from amino acids such as poly(caprolactam), and blends of polyamides with SURLYN, polyethylene, ethylene copolymers, ethyl-propylene-non-conjugated diene terpolymer, and the like;

(6) Acrylic resins and blends of these resins with poly vinyl chloride, elastomers, and the like;

(7) Thermoplastics, such as urethanes; olefinic thermoplastic rubbers, such as blends of polyolefins with ethylene-propylene-non-conjugated diene terpolymer; block copolymers of styrene and butadiene, isoprene or ethylene-butylene rubber; or copoly(ether-amide), such as PEBAX, sold by ELF Atochem of Philadelphia, Pa.;

(8) Polyphenylene oxide resins or blends of polyphenylene oxide with high impact polystyrene as sold under the trademark NORYL by General Electric Company of Pittsfield, Mass.;

(9) Thermoplastic polyesters, such as polyethylene terephthalate, polybutylene terephthalate, polyethylene terephthalate/glycol modified and elastomers sold under the trademarks HYTREL by E. I. DuPont de Nemours & Co. of Wilmington, Del., and LOMOD by General Electric Company of Pittsfield, Mass.;

(10) Blends and alloys, including polycarbonate with acrylonitrile butadiene styrene, polybutylene terephthalate, polyethylene terephthalate, styrene maleic anhydride, polyethylene, elastomers, and the like, and polyvinyl chloride with acrylonitrile butadiene styrene or ethylene vinyl acetate or other elastomers; and

(11) Blends of thermoplastic rubbers with polyethylene, propylene, polyacetal, nylon, polyesters, cellulose esters, and the like.

The cover may also include polymers, such as ethylene, propylene, 1-butene or 1-hexane based homopolymers or copolymers including functional monomers, such as acrylic and methacrylic acid or fully or partially neutralized ionomer resins, and their blends, methyl acrylate, methyl methacrylate homopolymers and copolymers, imidized, amino group containing polymers, polycarbonate, reinforced polyamides, polyphenylene oxide, high impact polystyrene, polyether ketone, polysulfone, poly(phenylene sulfide), acrylonitrile-butadiene, acrylic-styrene-acrylonitrile, poly(ethylene terephthalate), poly(butylene terephthalate), poly(ethelyne vinyl alcohol), poly(tetrafluoroethylene) and their copolymers including functional comonomers, and blends thereof. Suitable cover compositions also include a polyether or polyester thermoplastic urethane, a thermoset polyurethane, a low modulus ionomer, such as acid-containing ethylene copolymer ionomers, including E/X/Y terpolymers where E is ethylene, X is an acrylate or methacrylate-based softening comonomer present in about 0 to 50 weight percent and Y is acrylic or methacrylic acid present in about 5 to 35 weight percent. More preferably, in a low spin rate embodiment designed for maximum distance, the acrylic or methacrylic acid is present in about 15 to 35 weight percent, making the ionomer a high modulus ionomer. In a high spin embodiment, the cover includes an ionomer where an acid is present in about 10 to 15 weight percent and includes a softening comonomer. The cover may also be formed from the polybutadiene reaction product discussed above.

In one embodiment, at least one of the inner or outer cover layers is formed from polymers containing $\alpha,\beta$-unsaturated carboxylic acid groups, or the salts thereof, that have been 100 percent neutralized by organic fatty acids. The acid moieties of the highly-neutralized polymers ("HNP"), typically ethylene-based ionomers, are preferably neutralized greater than about 70 percent, more preferably greater than about 90 percent, and most preferably at least about 100 percent. The HNP's may be also be blended with a second polymer component, which, if containing an acid group, may be neutralized in a conventional manner, by the organic fatty acids of the present invention, or both. The second polymer component, which may be partially or fully neutralized, preferably comprises ionomeric copolymers and terpolymers, ionomer precursors, thermoplastics, polyamides, polycarbonates, polyesters, polyurethanes, polyureas, thermoplastic elastomers, polybutadiene rubber, balata, metallocene-catalyzed polymers (grafted and non-grafted), single-site polymers, high-crystalline acid polymers, cationic ionomers, and the like.

In this embodiment, the acid copolymers can be described as E/X/Y copolymers where E is ethylene, X is an $\alpha,\beta$-ethylenically unsaturated carboxylic acid, and Y is a softening comonomer. In a preferred embodiment, X is acrylic or methacrylic acid and Y is a $C_{1-8}$ alkyl acrylate or methacrylate ester. X is preferably present in an amount from about 1 to about 35 weight percent of the polymer, more preferably from about 5 to about 30 weight percent of the polymer, and most preferably from about 10 to about 20 weight percent of the polymer. Y is preferably present in an amount from about 0 to about 50 weight percent of the polymer, more preferably from about 5 to about 25 weight percent of the polymer, and most preferably from about 10 to about 20 weight percent of the polymer.

The organic acids are aliphatic, mono-functional (saturated, unsaturated, or multi-unsaturated) organic acids. Salts of these organic acids may also be employed. The salts of organic acids of the present invention include the salts of barium, lithium, sodium, zinc, bismuth, chromium, cobalt, copper, potassium, strontium, titanium, tungsten, magnesium, cesium, iron, nickel, silver, aluminum, tin, or calcium, salts of fatty acids, particularly stearic, bebenic, erucic, oleic, linoelic or dimerized derivatives thereof. It is preferred that the organic acids and salts of the present invention be relatively non-migratory (they do not bloom to the surface of the polymer under ambient temperatures) and non-volatile (they do not volatilize at temperatures required for-melt-blending).

Thermoplastic polymer components, such as copolyetheresters, copolyesteresters, copolyetheramides, elastomeric polyolefins, styrene diene block copolymers and their hydrogenated derivatives, copolyesteramides, thermoplastic polyurethanes, such as copolyetherurethanes, copolyesterurethanes, copolyureaurethanes, epoxy-based polyurethanes, polycaprolactone-based polyurethanes, polyureas, and polycarbonate-based polyurethanes fillers, and other ingredients, if included, can be blended in either before, during, or after the acid moieties are neutralized, thermoplastic polyurethanes.

Examples of these materials are disclosed in U.S. Patent Application Publication Nos. 2001/0018375 and 2001/0019971, the entire disclosures of which are incorporated herein by reference.

Polyurethanes

While the outer cover may be formed of any of the above-listed materials, the outer cover preferably includes a polyurethane, polyurea, or epoxy composition, generally comprising the reaction product of at least one polyisocyanate, polyol, and at least one curing agent. In one embodiment, the cover is formed of a polyurethane composition including the reaction product of at least one polyisocyanate, polyol, and at least one curing agent.

Any polyisocyanate available to one of ordinary skill in the art is suitable for use according to the invention. Exemplary polyisocyanates include, but are not limited to, 4,4'-diphenylmethane diisocyanate ("MDI"); polymeric MDI, carbodiimide-modified liquid MDI; 4,4'-dicyclohexylmethane diisocyanate ("$H_{12}$MDI"); p-phenylene diisocyanate ("PPDI"); m-phenylene diisocyanate ("MPDI"); toluene diisocyanate ("TDI"); 3,3'-dimethyl-4,4'-biphenylene diisocyanate ("TODI"); isophoronediisocyanate ("IPDI"); hex amethylene diisocyanate ("HDI"); naphthalene diisocyanate ("NDI"); xylene diisocyanate ("XDI"); para-tetramethylxylene diisocyanate ("p-TMXDI"); meta-tetramethylxylene diisocyanate ("m-TMXDI"); ethylene diisocyanate; propylene-1,2-diisocyanate; tetramethylene-1,4-diisocyanate; cyclohexyl diisocyanate; 1,6-hexamethylene-diisocyanate, dodecane-1,12-diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; methyl cyclohexylene diisocyanate; triisocyanate of HDI; triisocyanate of 2,4,4-trimethyl-1,6-hexane diisocyanate ("TMDI"), tetracene diisocyanate, napthalene diisocyanate, anthracene diisocyanate, isocyanurate of toluene diisocyanate; uretdione of hexamethylene diisocyanate; and mixtures thereof. Polyisocyanates are known to those of ordinary skill in the art as having more than one isocyanate group, e.g., di-, tri-, and tetra-isocyanate. In one embodiment, the polyisocyanate includes MDI, PPDI, TDI, or a mixture thereof. In another embodiment, the polyisocyanate includes MDI. It should be understood that, as used herein, the term "MDI" includes 4,4'-diphenylmethane diisocyanate, polymeric MDI, carbodiimide-modified liquid MDI, and mixtures thereof and, additionally, that the diisocyanate employed may be "low free monomer," understood by one of ordinary skill in the art to have lower levels of "free" monomer isocyanate groups, typically less than about 0.1 percent free monomer groups. Examples of "low free monomer" diisocyanates include, but are not limited to Low Free Monomer MDI, Low Free Monomer TDI, and Low Free Monomer PPDI.

The at least one polyisocyanate should have less than about 14 percent unreacted NCO groups. In one embodiment, the at least one polyisocyanate has no greater than about 7.5 percent NCO, more preferably, no greater than about 7 percent NCO. In one embodiment, the NCO content is from about 2.5 percent to about 7.5 percent, preferably from about 4 percent to about 6.5 percent.

Any polyol available to one of ordinary skill in the art is suitable for use according to the invention. Exemplary polyols include, but are not limited to, polyether polyols, hydroxy-terminated polybutadiene (including partially/fully hydrogenated derivatives), polyester polyols, polycaprolactone polyols, and polycarbonate polyols. In one embodiment, the polyol includes polyether polyol, more preferably those polyols that have the generic structure:

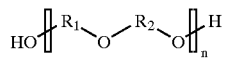

where $R_1$ and $R_2$ are straight or branched hydrocarbon chains, each containing from 1 to about 20 carbon atoms, and n ranges from 1 to about 45. Examples include, but are not limited to, polytetramethylene ether glycol ("PTMEG"), polyethylene propylene glycol, polyoxypropylene glycol, and mixtures thereof. The hydrocarbon chain can have saturated or unsaturated bonds and substituted or unsubstituted aromatic and cyclic groups. Preferably, the polyol of the present invention includes PTMEG.

In another embodiment, polyester polyols are included in the polyurethane material of the invention. Preferred polyester polyols have the generic structure:

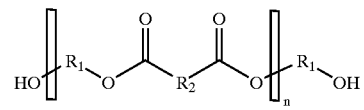

where $R_1$ and $R_2$ are straight or branched hydrocarbon chains, each containing from 1 to about 20 carbon atoms, and n ranges from 1 to about 25. Suitable polyester polyols include, but are not limited to, polyethylene adipate glycol, polybutylene adipate glycol, polyethylene propylene adipate glycol, ortho-phthalate-1,6-hexanediol, poly(hexamethylene adipate) glycol, and mixtures thereof. The hydrocarbon chain can have saturated or unsaturated bonds, or substituted or unsubstituted aromatic and cyclic groups.

In another embodiment, polycaprolactone polyols are included in the materials of the invention. Preferably, any polycaprolactone polyols have the generic structure:

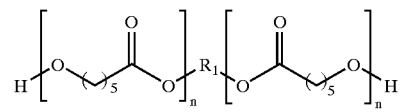

where $R_1$ is a straight chain or branched hydrocarbon chain containing from 1 to about 20 carbon atoms, and n is the chain length and ranges from 1 to about 20. Suitable polycaprolactone polyols include, but are not limited to, 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, PTMEG-initiated polycaprolactone, and mixtures thereof. The hydrocarbon chain can have saturated or unsaturated bonds, or substituted or unsubstituted aromatic and cyclic groups.

In yet another embodiment, the polycarbonate polyols are included in the polyurethane material of the invention. Preferably, any polycarbonate polyols have the generic structure:

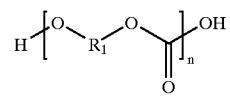

where $R_1$ is predominantly bisphenol A units —(p-$C_6H_4$)—$C(CH_3)_2$-(p-$C_6H_4$)— or derivatives thereof, and n is the chain length and ranges from 1 to about 20. Suitable polycarbonates include, but are not limited to, polyphthalate carbonate and poly(hexamethylene carbonate) glycol. The hydrocarbon chain can have saturated or unsaturated bonds, or substituted or unsubstituted aromatic and cyclic groups. In one embodiment, the molecular weight of the polyol is from about 200 to about 4000.

Polyamine curatives are also suitable for use in the polyurethane composition of the invention and have been found to improve cut, shear, and impact resistance of the resultant balls. Preferred polyamine curatives include, but are not limited to, 3,5-dimethylthio-2,4-toluenediamine and isomers thereof, 3,5-diethyltoluene-2,4-diamine and isomers thereof, such as 3,5-diethyltoluene-2,6-diamine; 4,4'-bis-(sec-butylamino)-diphenylmethane; 1,4-bis-(sec-butylamino)-benzene; 4,4'-methylene-bis-(2-chloroaniline); 4,4'-methylene-bis-(3-chloro-2,6-diethylaniline) ("MCDEA"); polytetramethyleneoxide-di-p-aminobenzoate; N,N'-dialkyldiamino diphenyl methane; pp'-methylene dianiline ("MDA"); m-phenylenediamine ("MPDA"); 4,4'-methylene-bis-(2-chloroaniline) ("MOCA"); 4,4'-methylene-bis-(2,6-diethylaniline) ("MDEA"); 4,4'-methylene-bis-(2,3-dichloroaniline) ("MDCA"); 4,4'-diamino-3,3'-diethyl-5,5'-dimethyl diphenylmethane; 2,2',3,3'-tetrachloro diamino diphenylmethane; 4,4'-methylene-bis-(3-chloro-2,6-diethylaniline); trimethylene glycol di-p-aminobenzoate; and mixtures thereof. Preferably, the curing agent of the present invention includes 3,5-dimethylthio-2,4-toluenediamine and isomers thereof, such as ETHACURE 300, commercially available from Albermarle Corporation of Baton Rouge, La. Suitable polyamine curatives, which include both primary and secondary amines, preferably have molecular weights ranging from about 64 to about 2000.

Other suitable polyamine curatives include those having the general formula:

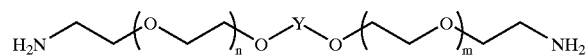

where n and m each separately have values of 0, 1, 2, or 3, and where Y is 1,2-cyclohexyl, 1,3-cyclohexyl, 1,4-cyclohexyl, ortho-phenylene, meta-phenylene, or para-phenylene, or a combination thereof. Preferably, n and m, each separately, have values of 0, 1, or 2, and preferably, 1 or 2.

At least one of a diol, triol, tetraol, or hydroxy-terminated curatives may be added to the aforementioned polyurethane composition. Suitable diol, triol, and tetraol groups include ethylene glycol; diethylene glycol; polyethylene glycol; propylene glycol; polypropylene glycol; lower molecular weight polytetramethylene ether glycol; 1,3-bis(2-hydroxyethoxy) benzene; 1,3-bis-[2-(2-hydroxyethoxy) ethoxy] benzene; 1,3-bis-{2-[2-(2-hydroxyethoxy) ethoxy] ethoxy} benzene; 1,4-butanediol; 1,5-pentanediol; 1,6-hexanediol; resorcinol-di-(β-hydroxyethyl) ether; hydroquinone-di-(β-hydroxyethyl) ether; and mixtures thereof. Preferred hydroxy-terminated curatives include 1,3-bis(2-hydroxyethoxy) benzene; 1,3-bis-[2-(2-hydroxyethoxy) ethoxy]benzene; 1,3-bis-{2-[2-(2-hydroxyethoxy) ethoxy] ethoxy}benzene; ethylene glycol; diethylene glycol; 1,4-butanediol; 1,5-pentanediol; 1,6-hexanediol, trimethylol propane, and mixtures thereof.

Preferably, the hydroxy-terminated curatives have molecular weights ranging from about 48 to about 2000. It should be understood that molecular weight, as used herein, is the absolute weight average molecular weight and would be understood as such by one of ordinary skill in the art. Other suitable hydroxy-terminated curatives have the following general chemical structure:

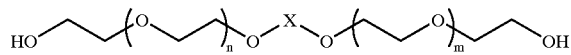

where n and m each separately have values of 0, 1, 2, or 3, and where X is ortho-phenylene, meta-phenylene, para-phenylene, 1,2-cyclohexyl, 1,3-cyclohexyl, or 1,4-cyclohexyl, or mixtures thereof. Preferably, n and m each separately have values of 0, 1, or 2, and more preferably, 1 or 2.

Both the hydroxy-terminated and amine curatives can include one or more saturated, unsaturated, aromatic, and cyclic groups. Additionally, the hydroxy-terminated and amine curatives can include one or more halogen groups. The polyurethane composition can be formed with a blend or mixture of curing agents. If desired, however, the polyurethane composition may be formed with a single curing agent.

The polyurethanes of the present invention may be thermoset or thermoplastic. Thermoset polyurethanes are obtained by curing at least one polyurethane prepolymer with a curing agent selected from a polyamine, triol or tetraol. Thermoplastic polyurethanes are obtained by curing at least one polyurethane prepolymer with a diol curing agent. The choice of the curatives is critical because some urethane elastomers that are cured with a diol and/or blends of diols do not produce urethane elastomers with the impact resistance required in a golf ball cover. Blending the polyamine curatives with diol cured urethane elastomeric formulations leads to the production of thermoset urethanes with improved impact and cut resistance. In addition, thermoplastic polyurethanes may be blended with suitable materials to produce a thermoplastic end product. Examples of such additional materials may include ionomers such as the SURLYN®, ESCOR® and IOTEK® copolymers described above.

Saturated Polyurethanes

In one embodiment of the present invention, saturated polyurethanes are used to form cover layers, preferably the outer cover layer, and may be selected from among both castable thermoset and thermoplastic polyurethanes. In this embodiment, the saturated polyurethanes are substantially free of aromatic groups or moieties. Thus, saturated diisocyanates which can be used include, but are not limited to, ethylene diisocyanate; propylene-1,2-diisocyanate; tetramethylene-1,4-diisocyanate; 1,6-hexamethylene-diisocyanate ("HDI"); 2,2,4-trimethylhexamethylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; isophorone diisocyanate ("IPDI"); methyl cyclohexylene diisocyanate; triisocyanate of HDI; triisocyanate of 2,2,4-trimethyl-1,6-hexane diisocyanate ("TMDI"). The most preferred saturated diisocyanates are 4,4'-dicyclohexylmethane diisocyanate ("HMDI") and isophorone diisocyanate ("IPDI").

When using saturated polyurethanes to form cover layers, the saturated polyols that are appropriate for use in this invention include, but are not limited to, polyether polyols such as polytetramethylene ether glycol and poly(oxypropylene) glycol. Suitable saturated polyester polyols include polyethylene adipate glycol, polyethylene propylene adipate glycol, polybutylene adipate glycol, polycarbonate polyol and ethylene oxide-capped polyoxypropylene diols. Saturated polycaprolactone polyols which are useful in the invention include diethylene glycol initiated polycaprolactone, 1,4-butanediol initiated polycaprolactone, 1,6-hexanediol initiated polycaprolactone; trimethylol propane initiated polycaprolactone, neopentyl glycol initiated polycaprolactone, PTMEG-initiated polycaprolactone. The most preferred saturated polyols are PTMEG and PTMEG-initiated polycaprolactone.

When using saturated polyurethanes to form at least one of the cover layers of the golf ball of the present invention, suitable saturated curatives include 1,4-butanediol, ethylene glycol, diethylene glycol, polytetramethylene ether glycol, propylene glycol; trimethanolpropane; tetra-(2-hydroxypropyl)-ethylenediamine; isomers and mixtures of isomers of cyclohexyldimethylol, isomers and mixtures of isomers of cyclohexane bis(methylamine); triisopropanolamine, ethylene diamine, diethylene triamine, triethylene tetramine, tetraethylene pentamine, 4,4'-dicyclohexylmethane diamine, 2,2,4-trimethyl-1,6-hexanediamine; 2,4,4-trimethyl-1,6-hexanediamine; diethyleneglycol di-(aminopropyl)ether; 4,4'-bis-(sec-butylamino)-dicyclohexylmethane; 1,2-bis-(sec-butylamino)cyclohexane; 1,4-bis-(sec-butylamino)cyclohexane; isophorone diamine, hexamethylene diamine, propylene diamine, 1-methyl-2,4-cyclohexyl diamine, 1-methyl-2,6-cyclohexyl diamine, 1,3-diaminopropane, dimethyl amino propyl amine, diethylamino propyl amine, imido-bis-propylamine, isomers and mixtures of isomers of diaminocyclohexane, monoethanolamine, diethanolamine, triethanolamine, monoisopropanolamine, and diisopropanolamine. The most preferred saturated curatives are 1,4-butanediol, 1,4-cyclohexyldimethylol and 4,4'-bis-(sec-butylamino)-dicyclohexylmethane.

Suitable catalysts include, but are not limited to bismuth catalyst, oleic acid, triethylenediamine (DABCO®-33LV), di-butyltin dilaurate (DABCO®-T12) and acetic acid. The most preferred catalyst is di-butyltin dilaurate (DABCO®-T12). DABCO® materials are manufactured by Air Products and Chemicals, Inc.

It is well known in the art that if the saturated polyurethane materials are to be blended with other thermoplastics, care must be taken in the formulation process so as to produce an end product which is thermoplastic in nature. Thermoplastic materials may be blended with other thermoplastic materials, but thermosetting materials are difficult if not impossible to blend homogeneously after the thermosetting materials are formed. Preferably, the saturated polyurethane comprises from about 1 percent to about 100 percent, more preferably from about 10 percent to about 75 percent of the cover composition and/or the intermediate layer composition. About 90 percent to about 10 percent, more preferably from about 90 percent to about 25 percent of the cover and/or the intermediate layer composition includes one or more other polymers and/or other materials as described below.

Such polymers include, but are not limited to polyurethane/polyurea ionomers, polyurethanes or polyureas, epoxy resins, polyethylenes, polyamides and polyesters, polycarbonates and polyacrylin. For example, the cover and/or intermediate layer may be formed from a blend of at least one saturated polyurethane and thermoplastic or thermoset ionic and non-ionic urethanes and polyurethanes, cationic urethane ionomers and urethane epoxies, ionic and non-ionic polyureas and blends thereof. Examples of suitable urethane ionomers are disclosed in U.S. Pat. No. 5,692,974, the disclosure of which is hereby incorporated by reference in its entirety. Other examples of suitable polyurethanes are described in U.S. Pat. No. 5,334,673, the entire disclosure of which is incorporated by reference herein. Examples of appropriate polyureas are discussed in U.S. Pat. No. 5,484,870 and examples of suitable polyurethanes cured with epoxy group containing curing agents are disclosed in U.S. Pat. No. 5,908,358, the disclosures of which are hereby incorporated herein by reference in their entirety.

Filler(s)

An optional filler component may be chosen to impart additional density to the unsaturated and saturated polyurethane blends. The selection of such filler(s) is dependent upon the type of golf ball desired (i.e., one-piece, two-piece multi-component, or wound). Examples of useful fillers include zinc oxide, barium sulfate, calcium oxide, calcium carbonate and silica, as well as the other well known corresponding salts and oxides thereof. Additives, such as nanoparticles, glass spheres, and various metals, such as titanium and tungsten, can be added to the polyurethane compositions of the present invention, in amounts as needed, for their well-known purposes. A variety of conventional components can be added to the cover compositions of the present invention. These include, but are not limited to, white pigment such as $TiO_2$, ZnO, optical brighteners, fluorescent pigments, surfactants, processing aids, foaming agents, UV stabilizers, light stabilizers, and other dyes. Such additional ingredients may be added in any amounts that will achieve their desired purpose.

For example, saturated polyurethanes are resistant to discoloration, however, they are not immune to deterioration in their mechanical properties upon weathering. Addition of UV absorbers and light stabilizers to any of the above compositions and, in particular, the polyurethane compositions, help to maintain the tensile strength, elongation, and color stability. Suitable UV absorbers and light stabilizers include TINUVIN® 328, TINUVIN® 213, TINUVIN® 765, TINUVIN® 770 and TINUVIN® 622. The preferred UV absorber is TINUVIN® 328, and the preferred light stabilizer is TINUVIN® 765. TINUVIN® products are available from Ciba-Geigy.

Method

Any method known to one of ordinary skill in the art may be used to combine the polyisocyanate, polyol, and curing agent of the present invention to obtain polyurethane. One commonly employed method, known in the art as a one-shot method, involves concurrent mixing of the polyisocyanate, polyol, and curing agent. This method results in a mixture that is inhomogenous (more random) and affords the manufacturer less control over the molecular structure of the resultant composition.

A more preferred method is known as the prepolymer method. In this method, the polyisocyanate and the polyol are mixed separately prior to addition of the curing agent. This method affords a more homogeneous mixture resulting in a more consistent polymer composition. Other methods suitable for forming the layers of the present invention include reaction injection molding ("RIM"), liquid injection molding ("LIM"), and pre-reacting the components to form an injection moldable thermoplastic polyurethane and then injection molding, all of which are known to one of ordinary skill in the art.

Due to the very thin nature, it has been found by the present invention that the use of a castable, reactive material, which is applied in a fluid form, makes it possible to obtain very thin outer cover layers on golf balls. Specifically, it has been found that castable, reactive liquids, which react to form a urethane elastomer material, provide desirable very thin outer cover layers.

The castable, reactive liquid employed to form the urethane elastomer material can be applied over the inner core using a variety of application techniques such as spraying, dipping, spin coating, or flow coating methods which are well known in the art. An example of a suitable coating technique is that which is disclosed in U.S. Pat. No. 5,733, 428, the disclosure of which is hereby incorporated by reference in its entirety in the present application.

The cover is preferably formed around the center components by mixing and introducing the material in the mold halves. It is important that the viscosity be measured over time, so that the subsequent steps of filling each mold half, introducing the core into one half and closing the mold can be properly timed for accomplishing centering of the core cover halves fusion and achieving overall uniformity. Suitable viscosity range of the curing urethane mix for introducing cores into the mold halves is determined to be approximately between about 2,000 cP and about 30,000 cP, with the preferred range of about 8,000 cP to about 15,000 cP.

To start the cover formation, mixing of the prepolymer and curative is accomplished in motorized mixer including mixing head by feeding through lines metered amounts of curative and prepolymer. Top preheated mold halves are filled and placed in fixture units using pins moving into holes in each mold. After the reacting materials have resided in top mold halves for about 50 to about 80 seconds, a core is lowered at a controlled speed into the gelling reacting mixture. At a later time, a bottom mold half or a series of bottom mold halves have similar mixture amounts introduced into the cavity.

A ball cup holds the ball core through reduced pressure (or partial vacuum) in hose. Upon location of the coated core in the halves of the mold after gelling for about 50 to about 80 seconds, the vacuum is released allowing core to be released. The mold halves, with core and solidified cover half thereon, are removed from the centering fixture unit, inverted and mated with other mold halves which, at an appropriate time earlier, have had a selected quantity of reacting polyurethane prepolymer and curing agent introduced therein to commence gelling.

Similarly, U.S. Pat. Nos. 5,006,297 and 5,334,673 both also disclose suitable molding techniques which may be utilized to apply the castable reactive liquids employed in the present invention. The disclosures of these patents are hereby incorporated by reference in their entirety. However, the method of the present invention is not limited to the use of only these techniques.

Hardness

The hardness of the cover is typically from about 35 to 80 Shore D, preferably from about 40 to 78 Shore D, and more preferably from about 45 to 75 Shore D. In one embodiment, the material of the outer cover layer has a hardness, as measured by ASTM-2240, of about 30 Shore D to about 60 Shore D. In another embodiment, the hardness of the cover material is about 35 Shore D to about 55 Shore D. The inner cover layer, if present, preferably has a material hardness from about 50 to about 75 Shore D, preferably from about 60 to about 65 Shore D.

As discussed herein, the outer cover layer is preferably formed from a relatively soft -polyurethane material. In one embodiment, the material of the outer cover layer has a material hardness, as measured by ASTM-D2240, less than about 45 Shore D, preferably less than about 40 Shore D, more preferably between about 25 and about 40 Shore D, and most preferably between about 30 and about 40 Shore D. The inner cover layer preferably has a material hardness of less than about 70 Shore D, more preferably between about 30 and about 70 Shore D, and most preferably, between about 50 and about 65 Shore D.

Flexural Modulus

The flexural modulus of the cover material on the golf balls, as measured by ASTM method D-790M, is typically greater than about 500 psi. In one embodiment, the golf ball cover materials has a flexural modulus of about 500 psi to about 150,000 psi. In another embodiment, the golf ball cover material of the present invention has a flexural modulus of about 1000 psi to 300,000 psi. In yet another embodiment, the cover material has a flexural modulus of about 2000 to 200,000 psi.

If the cover of the golf ball has only one layer, it is preferred that the cover have a flexural modulus from about 10,000 psi to about 70,000 psi, and more preferably from about 25,000 psi to about 55,000 psi. In contrast, if the cover has more than one layer, the flexural modulus of each layer may differ from other cover layers. For instance, in one embodiment of the present invention the outer cover layer may have a flexural modulus from about 5,000 psi to about 70,000 psi, and more preferably is from about 10,000 psi to about 30,000 psi. Even more preferably, the flexural modulus of the outer cover layer is less than about 20,000 psi.

In addition, in one embodiment of the present invention the inner cover layer of a two-layer cover may have a flexural modulus from about 30,000 to about 150,000, and preferably is from about 40,000 psi to about 90,000 psi. Even more preferrably, the flexural modulus of the inner cover layer may be from about 50,000 psi to about 70,000 psi. It should be noted, however, that while the values provided in the examples above suggest a preferred cover construction of an outer cover layer having a flexural modulus lower than that of an inner cover layer, the orientation of the layers may be reversed. That is, the flexural modulus values for the outer cover layer stated above may be used for an inner cover and the values for the inner cover stated above may be used for an outer cover layer if such a cover construction is desired.

Golf Ball Construction

Figure 2:
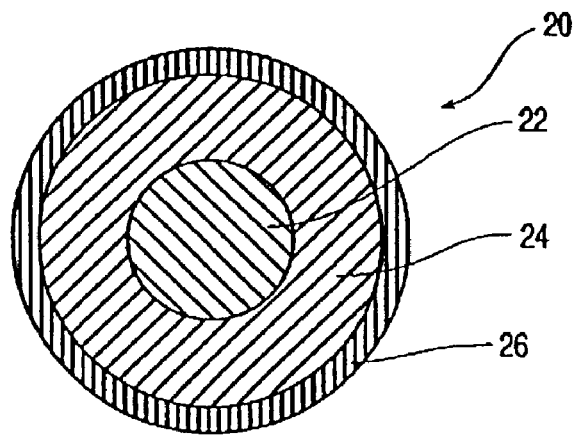
FIG. 2 is a cross-section of a golf ball having an intermediate layer between a cover and a center according to the invention.
Figure 3:
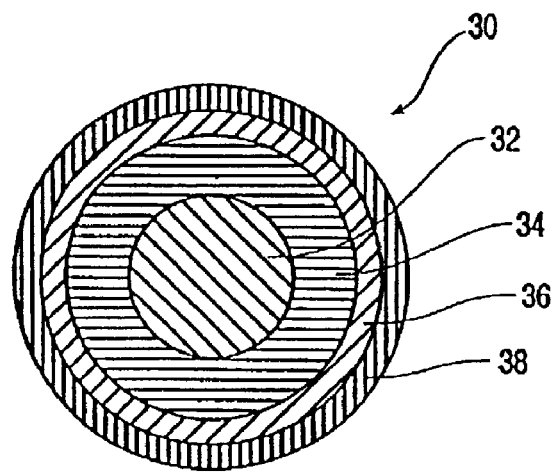
FIG. 3 is a cross-section of a golf ball having more than one intermediate layer between a cover and a center according to the invention.

Referring to FIG. 1, a golf ball 10 of the present invention can include a core 12, a cover 16, and optional inner cover layer 16 surrounding the core 12. Referring to FIG. 2, a golf ball 20 of the present invention can include a center 22, a cover 26, an inner cover layer 26a, and at least one intermediate layer 24 disposed between the cover and the center. Each of the cover and center may also include more than one layer; i.e., the golf ball can be a conventional three-piece wound ball, a two-piece ball, a ball having a multi-layer core or an intermediate layer or layers, etc. Thus, referring to FIG. 3, a golf ball 30 of the present invention can include a center 32, a cover 38, and intermediate layers 34 and 36 disposed between the cover and the center. Although FIG. 3 shows only two intermediate layers, it will be appreciated that any number or type of intermediate layers may be used, as desired.

For example, intermediate layers may each be solid or wound, but in one embodiment each intermediate layer is preferably solid. In another embodiment of this invention, an intermediate layer of at least one tensioned elastomeric thread material is wound about the center or another intermediate layer. In one preferred embodiment, the thread material incorporates the polybutadiene reaction product of the invention.

Diameters/Thicknesses

Although the United States Golf Association ("USGA") specifications limit the minimum size of a competition golf ball to 1.680 inches with no specification as to the maximum diameter, the polymer compositions of the present invention may be used in golf balls of any size. In one embodiment, the golf balls of the invention have a diameter of about 1.5 to 1.8 inches. In another embodiment, the diameter of the present golf balls is from about 1.680 inches to about 1.800 inches. In yet another embodiment, the diameter is from about 1.680 inches to about 1.760 inches. In still another embodiment, the diameter is about 1.680 inches to about 1.740 inches.

The core typically has an outer diameter that ranges from about 1.5 inches to about 1.62 inches, preferably from about 1.51 inches to 1.6 inches. In one embodiment, the core diameter is less than about 1.610 inches, preferably, no greater than 1.590 inches, more preferably between about 1.540 inches and about 1.580 inches, and most preferably between about 1.50 inches to about 1.570 inches.

In one embodiment, the core includes a center portion and at least one intermediate layer, wherein the intermediate layer is disposed about the center portion. The center portion has an outer diameter that typically ranges from about 0.75 inches to 1.50 inches, preferably from about 0.85 inches to 1.4 inches, and more preferably from about 1.0 inches to 1.25 inches.

Whether the golf ball core has a single intermediate layer or a plurality of intermediate layers or inner cover layers disposed about the center portion, the layers may have a cumulative thickness of about 0.6 inches or less, although it is preferred that the cumulative thickness is about 0.25 inches or less. The thickness of each intermediate layer may be varied in order to achieve a desired ball performance. It is preferred, however, that any one layer be about 0.01 inches or greater in thickness. If the intermediate layer is an inner cover layer, it is preferred that the thickness is about 0.02 inches or greater. In one embodiment of the present invention, it is preferred that the cumulative thickness of the intermediate layer(s) is about 0.04 inches or greater. Taking into account these preferred values, suitable ranges for the cumulative thickness of the intermediate layer(s) may include, for examples layers that are from about 0.05 inches to about 0.6 inches thick in total. More preferably, the cumulative thickness of the intermediate layer(s) is from about 0.07 inches to about 0.3 inches thick. In one embodiment, the intermediate layer(s) may have a cumulative thickness of from about 0.06 inches to about 0.08 inches, while in another embodiment the thickness may be from about 0.25 inches to about 0.3 inches thick.

The outer diameter of these layers is preferably between 1.580 inches and about 1.640 inches, more preferably between about 1.590 inches to about 1.630 inches, and most preferably between about 1.600 inches to about 1.630 inches.

The cover typically has a thickness to provide sufficient strength, good performance characteristics and durability. In one embodiment, the cover is less than about 0.1 inches thick, and more preferably, is less than about 0.05 inches thick. In another embodiment, the cover has a thickness from about 0.02 inches to about 0.04 inches.

In another embodiment, multiple cover layers are disposed about a core to form a golf ball. In this embodiment of the invention, the golf ball typically has two cover layers, a first cover layer (inner layer) being exterior to and contacting the core, and a second cover layer (outer layer) disposed about the first cover layer. In this embodiment, the core typically has an outer diameter that ranges from about 1.4 inches to 1.62 inches, typically from about 1.45 inches to about 1.55 inches.

When a cover having two layers is used, the ball preferably is formed with a core having a center and at least one intermediate layer. At least one of the inner and outer cover layers has a thickness of less than about 0.05 inches, more preferably less than about 0.4 inches, and more preferably from about 0.02 inches to about 0.04 inches. In one embodiment, the thickness of either cover layer is about 0.03 inches or less.

In another embodiment, the cover is at least about 0.03 inches thick, but preferably is from about 0.03 inches to about 0.125 inches. In yet another embodiment, the cover is about 0.05 inches to about 0.1 inches thick.

In one embodiment of the invention, the cover is about 0.05 inches thick and has a hardness of about 58 Shore D to about 68 Shore D, with an exemplary Shore D hardness being about 62.

Dimple Coverage

The golf balls of the invention may have a dimple coverage of the surface area of the cover of at least about 60 percent, preferably at least about 65 percent, and more preferably at least 70 percent or greater. Dimple patterns having even higher dimple coverage values may also be used with the present invention. Thus, the golf balls of the present invention may have a dimple coverage of at least about 75 percent or greater, about 80 percent or greater, or even about 85 percent or greater.

The manner in which the dimples are arranged on the surface of the ball can be by any available method. For instance, the ball may have an icosohedron-based pattern, such as described in U.S. Pat. No. 4,560,168, or an octahedral-based dimple patters as described in U.S. Pat. No. 4,960,281. Alternatively, the dimple pattern can be arranged according to phyllotactic patterns, such as described in U.S. Pat. No. 6,338,684, which is incorporated herein in its entirety.

One of ordinary skill in the art would appreciate that other dimple patterns could also be used in order to achieve certain ball flight characteristics. Dimple patterns that provide a high percentage of surface coverage are preferred, and are well known in the art. For example, U.S. Pat. Nos. 5,562,552, 5,575,477, 5,957,787, 5,249,804, and 4,925,193 disclose geometric patterns for positioning dimples on a golf ball. A tubular lattice pattern, such as the one disclosed in U.S. Pat. No. 6,290,615, which is incorporated by reference in its entirety herein, may also be used with golf balls of the present invention.

Several additional non-limiting examples of dimple patterns with varying sizes of dimples are also provided in U.S. patent application Ser. No. 09/404,164 and U.S. Pat. No. 6,213,898, the entire disclosures of which are incorporated by reference herein.

The total number of dimples on the ball, or dimple count, may vary depending such factors as the sizes of the dimples and the pattern selected. In general, the total number of dimples on the ball preferably is between about 100 to about 1000 dimples, although one skilled in the art would recognize that differing dimple counts within this range can significantly alter the flight performance of the ball. In one embodiment, the dimple count is about 380 dimples or greater, but more preferably is about 400 dimples or greater, and even more preferably is about 420 dimples or greater. In one embodiment, the dimple count on the ball is about 422 dimples. In some cases, it may be desirable to have fewer dimples on the ball. Thus, one embodiment of the present invention has a dimple count of about 380 dimples or less, and more preferably is about 350 dimples or less.

Hardness Gradient

One of ordinary skill in the art can, in light of this disclosure, readily prepare a core with a plurality of solid intermediate layers disposed about a center portion, wherein no single layer has two points where the hardness differs by more than 10 percent, but cumulatively the hardness differs by more than about 10 percent across a plurality of the layers. For example, a core including a two-layer center portion manufactured with a composition of this invention with a hardness gradient of 10 percent across the entire golf ball center, would be within the scope of the invention. The gradients between successive layers may, but need not, overlap.

In one embodiment, the intermediate layers have little or no hardness gradient, such that the hardness at one point of a given intermediate layer will be less than 10 percent different than the hardness at another point in the same intermediate layer.

Compression

The compression of the core, or portion of the core, of golf balls prepared according to the invention is typically below about 75, preferably below about 50, more preferably below about 25. As used herein, the terms "Atti compression" or "compression" are defined as the deflection of an object or material relative to the deflection of a calibrated spring, as measured with an Atti Compression Gauge, that is commercially available from Atti Engineering Corp. of Union City, N.J. Atti compression is typically used to measure the compression of a golf ball.

In one embodiment, the core of the present invention has an Atti compression of less than about 80, more preferably, between about 40 and about 80, and most preferably, between about 50 and about 70. In an alternative, low compression embodiment, the core has a compression less than about 20, more preferably less than about 10, and most preferably, 0. As known to those of ordinary skill in the art, however, the cores generated according to the present invention may be below the measurement of the Atti Compression Gauge.

The golf balls of the invention may have an Atti compression (which has been referred to as PGA compression in the past) of at least about 40, preferably from about 50 to 120, and more preferably from about 60 to 100. In one embodiment, the compression of the golf ball is about 90 or greater, while in another it is about 100 or greater. Compression values are dependent on the diameter of the component being measured.

Coefficient of Restitution

The resultant golf balls typically have a coefficient of restitution of greater than about 0.7, preferably greater than about 0.75 and more preferably greater than about 0.78. In one embodiment the coefficient of restitution is greater than about 0.8. As used herein, the term "coefficient of restitution" for golf balls is defined as the ratio of the rebound velocity to the inbound velocity when balls are fired into a rigid plate.

One of ordinary skill in the art would understand that the measured COR of a golf ball can change depending upon the velocity at which it is fired into a rigid plate. While COR values for golf balls have been reported in the past by others based on a variety of different inbound velocities, the COR values discussed herein correspond to an inbound velocity of 125 ft/s. Preferably, the COR of golf balls made according to the present invention have a COR of about 0.81 or greater, and more preferably are about 0.82 or greater.

EXAMPLES

The following non-limiting examples are merely illustrative of the preferred embodiments of the present invention, and are not to be construed as limiting the invention, the scope of which is defined by the appended claims.

Examples 1–5

Cores Formed from Various Rubber Formulations

A variety of cores, having a diameter of 1.58 inches, were prepared according to the present invention, as well as some cores prepared using conventional materials are presented in Table 3. The recipes for each core, and values measured for compression and COR are presented below:

TABLE 3

Golf Ball Core Properties from Various Rubber Formulations

| Ingredients | Mooney viscosity @ 100° C. | 1 | 2 | 3 | 4 | 5 |
| --- | --- | --- | --- | --- | --- | --- |
| CB23 | 51 | 100 | | | | |
| CB22 | 63 | | 100 | | | |
| BR-60 | 60 | | | 100 | | |
| Taktene 8855 | 48 | | | | 100 | |
| CARIFLEX BR1220 | 43 | | | | | 100 |
| zinc diacrylate | | 28 | 28 | 28 | 28 | 28 |
| Peroxide | | 0.53 | 0.53 | 0.53 | 0.53 | 0.53 |
| Zinc oxide | | 4.3 | 4.3 | 4.3 | 4.3 | 4.3 |
| Tungsten | | 11.0 | 11.0 | 11.0 | 11.0 | 11.0 |
| Core Properties | | | | | | |
| Compression | | 77 | 75 | 77 | 76 | 71 |
| COR @ 125 ft/s | | 0.815 | 0.811 | 0.810 | 0.807 | 0.802 |

Examples 6–18

Cores Employing Various Cis-to-trans Catalysts

A variety of metal sulfide cis-to-trans catalysts that successfully converted a portion of the cis-isomer polybutadiene isomer to the trans-isomer are presented in Table 4. CARIFLEX BR-1220 polybutadiene (100 phr) was reacted with zinc oxide (5 phr), dicumyl peroxide (3 phr, the free radical initiator), zinc diacrylate (25 phr), and cis-to-trans to form the reaction product as described in the present invention.

Trans-isomer conversion percentages range from below 6 percent to above 16 percent for the various catalysts that are present in amounts ranging from below 2 phr to above 5 phr. The table clearly demonstrates the effectiveness of numerous different cis-to-trans catalysts, at varying concentrations, for increasing the trans-isomer polybutadiene content.

percent compared to the 1.5 percent trans-isomer of the conventional ball. Identical intermediate layers, having outside diameters of approximately 1.58 inches, were constructed around each solid center to form a core.

The compression and COR values were measured for the two cores. The compression of the core prepared according to the current invention was measured to be 77 and the compression of the core of the conventional ball was measured to be 78. The COR value of the conventional center was measured to be 0.774, whereas the COR value of the core of the present invention was measured to be 0.789. Therefore, the present invention resulted in a center and a core having a higher resilience at similar compression compared to a center constructed with conventional technology.

An identical cover was added to both centers and the compression and COR were measured again. The compression for both balls was measured to be 89, yet the COR

TABLE 4

Metal Sulfide Conversion Examples

| Example No. | 6 | 7 | 8 | 9 | 10 | 11 | 12 | 13 | 14 | 15 | 16 | 17 | 18 |
|---|---|---|---|---|---|---|---|---|---|---|---|---|---|
| CARIFLEX BR1220 | 100 | 100 | 100 | 100 | 100 | 100 | 100 | 100 | 100 | 100 | 100 | 100 | 100 |
| Zinc oxide | 5 | 5 | 5 | 5 | 5 | 5 | 5 | 5 | 5 | 5 | 5 | 5 | 5 |
| Dicumyl peroxide | 3 | 3 | 3 | 3 | 3 | 3 | 3 | 3 | 3 | 3 | 3 | 3 | 3 |
| Zinc Diacrylate | 25 | 25 | 25 | 25 | 25 | 25 | 25 | 25 | 25 | 25 | 25 | 25 | 25 |
| Cis-to-Trans "Catalyst" | | | | | | | | | | | | | |
| FeS | 2.87 | | | | | | | | | | | | |
| MnS | | 2.65 | | | | | | | | | | | |
| $TiS_2$ | | | 1.70 | | | | | | | | | | |
| CaS | | | | 2.20 | | | | | | | | | |
| CoS | | | | | 2.77 | | | | | | | | |
| $MoS_2$ | | | | | | 2.43 | | | | | | | |
| $WS_2$ | | | | | | | 3.77 | | | | | | |
| $Cu_2S$ | | | | | | | | 4.65 | | | | | |
| $SeS_2$ | | | | | | | | | 2.19 | | | | |
| $Y_2S_3$ | | | | | | | | | | 2.76 | | | |
| ZnS | | | | | | | | | | | 2.97 | | |
| $Sb_2S_3$ | | | | | | | | | | | | 3.45 | |
| $Bi_2S_3$ | | | | | | | | | | | | | 5.22 |
| % Trans BR isomer Precure | 1.5 | 1.5 | 1.5 | 1.5 | 1.5 | 1.5 | 1.5 | 1.5 | 1.5 | 1.5 | 1.5 | 1.5 | 1.5 |
| % Trans BR isomer Postcure | 10.5 | 16.1 | 17.0 | 8.3 | 10.3 | 10.1 | 9.2 | 5.8 | 5.2 | 10.2 | 10.1 | 10.7 | 10.5 |

Example 19

Dual Core Golf Balls

A dual core golf ball according to the present invention was created having a solid center, an intermediate layer surrounding the solid center, and a cover disposed concentrically around the intermediate layer. The components and physical characteristics are presented in Table 5.

A solid center was constructed for the ball of the present invention and for a ball of conventional technology. The centers were both created from CARIFLEX BR1220 polybutadiene as the starting material, the only difference being replacing the VAROX 802-40KE-HP peroxide (conventional technology) with a ditolyl disulfide cis-to-trans catalyst of the current invention and dicumyl peroxide. This substitution allows a portion of the polybutadiene material to be converted to the trans-configuration during the molding process. The resulting solid centers had outside diameters of approximately 1.15 inches. The polybutadiene reaction product prepared thereby had a trans-isomer content of 40 values were 0.791 and 0.802 for the conventional ball and the ball of the present invention, respectively. The present invention resulted in a ball having the same compression with a higher resilience (COR) compared to a ball constructed with conventional technology.

TABLE 5

Conventional vs. Invention

| | Conventional | Example 19 |
|---|---|---|
| Center 1.15" Diameter | | |
| Shell 1220 | 100 | 100 |
| ZDA | 20 | 20 |
| Varox 802-40KE-HP | 0.89 | 0 |
| Dicumyl Peroxide | 0 | 2.5 |
| Zinc Oxide | 40 | 39 |
| Ditolyl disulfide | 0 | 0.75 |
| Percent Trans | | |
| Precure | 1.5 | 1.5 |

TABLE 5-continued

Conventional vs. Invention

| | Conventional | Example 19 |
|---|---|---|
| Postcure | 1.5 | 40 |
| Load in lbs Required 10.8% Deflection | 85 | 109 |
| Intermediate Layer 1.58" Diameter | | |
| Shell 1220 | 80 | 80 |
| ZDA | 38 | 38 |
| Varox 231 XL | 0.42 | 0.42 |
| DBDB-60 | 0.15 | 0.15 |
| Zinc Oxide | 6 | 6 |
| Trans-Polyisoprene | 20 | 20 |
| Dual Core Properties 1.58" Diameter | | |
| Compresion | 78 | 77 |
| COR | 0.774 | 0.789 |
| Cover Material | | |
| Na VLMI | 30 | 30 |
| Na SURLYN | 30 | 30 |
| Li SURLYN | 40 | 40 |
| Shore D | 63 | 63 |
| Ball Properties | | |
| Compression | 89 | 89 |
| COR | 0.791 | 0.802 |
| Driver Spin | 2800 | 2850 |

Examples 20–23

Cores Prepared with Sulfur Catalyst

As described above, one aspect of the present invention utilizes polymeric sulfur or elemental sulfur catalysts. Examples 20–23, described in Table 6 below, illustrate the different ball properties that result when using these catalysts. Examples 20 and 21 are golf balls that lack elemental or polymeric sulfur as a catalyst. Examples 22 & 23 were prepared using similar compositions to the balls described in Examples 20 and 21, but including elemental or sulfur catalysts.

These constituents were mixed and molded, thereby converting a percentage of cis- to a trans-conformation, in a solid sphere sized like the core of a golf ball. The compression and coefficient were measured for these cores, each having a 1.58 inch diameter. Examples 22–23 illustrate the significant conversion of cis-isomer polybutadiene to trans-isomer polybutadiene when a sulfur cis-to-trans catalyst is present according to the invention compared to the lack of conversion in Examples 20–22 when no sulfur catalyst is present. Moreover, Examples 22–23 illustrate the improved coefficient of restitution with no significant change in compression that can be achieved with golf balls including the reaction product according to the invention.

TABLE 6

Cores Prepared with Sulfur Catalyst

| | Example 20 (Prior Art) | Example 21 (Prior Art) | Example 22 | Example 23 |
|---|---|---|---|---|
| REACTION PRODUCT | | | | |
| Polybutadiene Rubber (CARIFLEX BR1220) | 100 phr | 100 phr | 100 phr | 100 phr |
| Zinc Oxide (ZnO) | 26.6 phr | 2.67 phr | 26.6 phr | 26.6 phr |
| Barium Sulfate (BaSO$_4$) | — | 31 phr | — | — |
| zinc diacrylate | 20 phr | 22.3 phr | 20 phr | 20 phr |
| dicumyl peroxide | 2 phr | — | 2 phr | 2 phr |
| VAROX 802 40KE-HP[a] | — | 0.89 phr | — | — |
| Polymeric sulfur | 0 phr | 0 phr | 0.25 phr | 0 phr |
| Elemental sulfur | 0 phr | 0 phr | 0 phr | 0.25 phr |
| Pre-cure trans-poly-butadiene content | 1.5% | 1.5% | 1.5% | 1.5% |
| GOLF BALL CORE | | | | |
| Post-cure trans-poly-butadiene content in reaction product | 1.5% | 1.5% | 12% | 12% |
| Atti Compression | 53 | 23 | 26 | 21 |
| Coeff. of Restitution ("COR") | N/A[b] | 0.72 | 0.77 | 0.76 |

[a] A di-(2-t-butylisopropylperoxy)-benzene peroxide commercially available from R T Vanderbilt of Norwalk, CT.
[b] The core of Example 20 was sufficiently rigid to crack during testing of the coefficient of restitution, indicating an undesirably low COR.

Examples 24–28

Comparison of Center Compositions

Polybutadiene reaction products according to the invention were prepared according to the recipes in Table 7. It can be seen in Table 7 that the coefficient of restitution of the center is higher for each of Examples 25–26 manufactured in accordance with this invention than for prior art Example 24. A large portion of the difference in the coefficient of restitution between the center of the prior art to the centers of this invention is maintained to the finished ball, providing the ball with improved characteristics. The coefficient of restitution is higher than that measured on the control ball, Example 24, whether the compression was above or equal to that of the control ball.

In addition, Table 7 shows a dual core ball (Example 28) that was manufactured from a composition including effective amounts of an organosulfur catalyst including ditolyl disulfide. The starting material also contained 1,4-cis-isomer polybutadiene, of which greater than 98 percent was cis-isomer polybutadiene. Example 27 demonstrates a prior art ball.

After the conversion reaction, the prior art ball of Example 27 had the same amount of trans-polybutadiene as before the procedure, because no cis-to-trans catalyst was present. The composition of Example 28 contained over 24 percent trans-isomer polybutadiene. The Shore C hardness range ranged from 51 to 71, with a Shore C difference of greater than 20 percent, between the center of the core and the surface of the core. The difference in the coefficient of restitution in the center, 0.723 for the prior art versus 0.750 for the center manufactured according to the invention, was partially carried through to the finished ball. The properties of this improved ball prepared in accordance with the invention are set forth in Table 7.

The cover for each example was made of 30 parts SURLYN 8320; 40 parts SURLYN 7940; 30 parts SURLYN 7930; with an additional 5 parts color concentrate based on the weight of the three SURLYN components.

Examples 27–28 balls have virtually the same compression, although the ball prepared according to the invention has a surprisingly improved, and statistically significant, coefficient of restitution compared to the prior art ball.

TABLE 7

Prior Art Centers v. Invention Centers

| Example No. | 24 (Prior Art) | 25 | 26 | 27 (Prior Art) | 28 |
|---|---|---|---|---|---|
| CENTER MATERIALS | | | | | |
| polybutadiene rubber[1] | 100 phr | 100 phr | 100 phr | 25.1 phr | 25.1 phr |
| UBEPOL 130 B[2] | — | — | — | 62.4 | 62.4 |
| ENICHEM NEOCIS BR40[3] | — | — | — | 12.5 | 12.5 |
| zinc diacrylate | 22.5 | 20 | 23 | 22.5 | 22.5 |
| POLYWATE 325[4] | — | — | — | 35 | 35 |
| Zinc oxide | — | — | — | 5.3 | 5.3 |
| VAROX 802-40KE-HP[5] | 0.9 | — | — | 0.9 | — |
| ditolyl disulfide | — | 0.625 | 0.625 | — | 0.63 |
| Coloring | — | — | — | 0.1 | 0.1 |
| EF (DCP)-70[6] | — | 2 | 2 | — | 2 |
| CENTER PROPERTIES (1.13 in. diameter) | | | | | |
| Coeff. of Restitution (COR) | 0.727 | 0.751 | 0.756 | 0.723 | 0.750 |
| INTERMEDIATE LAYER MATERIALS | | | | | |
| 1,4-cis-polybutadiene[1,2] | 80 | 80 | 80 | 80 | 80 |
| trans-polyisoprene[7] | 20 | 20 | 20 | 20 | 20 |
| Zinc diacrylate | 38 | 38 | 38 | 38 | 38 |
| Zinc oxide | 5.6 | 5.6 | 5.6 | 5.6 | 5.6 |
| VAROX 231 XL[5] | 0.42 | 0.42 | 0.42 | 0.42 | 0.42 |
| EF (DCP)-70[6] | 0.15 | 0.15 | 0.15 | 0.15 | 0.15 |
| Coloring agent | 0.42 | 0.42 | 0.42 | 0.42 | 0.42 |
| CORE PROPERTIES (1.58 in. diameter) | | | | | |
| Diameter (inches) | 1.581 | 1.582 | 1.582 | 1.580 | 1.580 |
| Shore C Compression | 74 | 71 | 79 | 74 | 72 |
| COR of the Core | 0.775 | 0.791 | 0.794 | 0.768 | 0.781 |
| BALL PROPERTIES | | | | | |
| Compression | 88 | 85 | 88 | 89 | 90 |
| COR of the Ball | 0.785 | 0.805 | 0.804 | 0.788 | 0.797 |

[1] from CARIFLEX BR 1220, from H. MUEHLSTEIN & CO., INC., Norwalk, CT.
[2] polybutadiene rubber from UBE INDUSTRIES, LTD., New York, NY.
[3] polybutadiene rubber from ENICHEM ELASTOMERS, INC, New York, NY.
[4] from CIMBAR PERFORMANCE MINERALS, Cartersville, GA.
[5] organic peroxide from R. T. VANDERBILT, Norwalk, CT.
[6] organic peroxide from ELASTOCHEM, INC., Chardon, OH.
[7] KURARY TP251, from KURARAY Co., Ltd. of Tokyo, Japan.

Examples 29–31

Cores With Cis-to-Trans Catalysts

Organosulfur Compounds

A cores according to the present invention was created employing an organosulfur compound as the cis-to-trans conversion catalyst (Example 29). The resultant core properties clearly demonstrate the advantages of a golf ball core made according to the current invention as compared to example cores constructed with conventional technology. The components and physical characteristics are presented in Table 8.

The compressive load of cores prepared according to the invention is approximately half of the compressive load of cores constructed in accordance with U.S. Pat. Nos. 5,697,856, 5,252,652, and 4,692,497, while at the same time retaining roughly the same, and in some cases higher, COR (resilience). Example 29 has a lower compressive load (soft), yet is resilient (fast). The compressive load is greater than that of a core constructed in accordance with U.S. Pat. No. 3,239,228, but has a significantly higher COR. The core of U.S. Pat. No. 3,239,228 is very soft and very slow (very low COR).

The percent change in dynamic stiffness from 0° C. to −50° C. was also measured at both the edge and center of the cores. The dynamic stiffness at both the edge and the center of Example 29 varied only slightly, less than 20 percent, over the temperature range investigated. The core made according to U.S. Pat. No. 3,239,228 varied over 230 percent, whereas the cores made according to other conventional technology, had a dynamic stiffness that varied by greater than 130 percent, and typically by as much as 150 percent, over the same temperature range.

The percent of trans-conversion was also measured at both the center and edge of the core prepared according to the current invention, and for cores prepared as disclosed in the same four patents mentioned above, allowing a trans-gradient to be calculated. Example 29 had a trans-gradient of about 32 percent from edge to center. For the core prepared according to the current invention, the pre- and post-cure trans-percentages was also measured to determine the effectiveness of that process. The percentage of polybutadiene converted to the trans-isomer ranged from almost 40 percent at the center to greater than 55 percent at the edge. Two of the cores prepared according to conventional technology, U.S. Pat. Nos. 3,239,228 and 4,692,497, had a zero trans-gradient. A third core, prepared according to U.S. Pat. No. 5,697,856, had only a slight trans-gradient, less than 18 percent from edge to center. A fourth core, prepared according to U.S. Pat. No. 5,252,652, had a very large gradient, almost 65 percent from edge to center.

Inorganic Sulfide Compounds

A core according to the present invention was created employing an inorganic sulfide compound as the cis-to-trans conversion catalyst (Example 30). The resultant core properties clearly demonstrate the advantages of a golf ball core made according to the current invention as compared to example cores constructed with conventional technology. The components and physical characteristics are presented in Table 8.

The compressive load is approximately half of the compressive load of three cores constructed in accordance with U.S. Pat. Nos. 5,697,856, 5,252,652, and 4,692,497, while at the same time retaining roughly the same, and in some cases, a higher COR (resilience). Example 30 is soft, yet resilient (fast). The compressive load is greater than a core constructed in accordance with U.S. Pat. No. 3,239,228, but has a significantly higher COR. The core of U.S. Pat. No. 3,239,228 is very soft and very slow (low COR).

The percent change in dynamic stiffness from 0° C. to −50° C. was also measured at both the edge and center of the cores. The dynamic stiffness at both the edge and the center of Example 30 varied only slightly, less than 125 percent, over the temperature range investigated. The core made according to U.S. Pat. No. 3,239,228 varied over 230 percent, whereas the cores made according to other conventional technology, had a dynamic stiffness that varied by greater than 130 percent, and typically by as much as 150 percent, over the same temperature range.

The percent of trans-conversion was also measured at both the center and edge of the core prepared according to the current invention, and for cores prepared according to the same four patents mentioned above, allowing a trans-gradient to be calculated. Example 30 had a trans-gradient of about 45 percent from edge to center. Two of the cores prepared in accordance with U.S. Pat. Nos. 3,239,228 and 4,692,497 had a zero trans-gradient. A third core, prepared in accordance with U.S. Pat. No. 5,697,856, had only a slight trans-gradient, less than 18 percent from edge to center. A fourth core, prepared in accordance with U.S. Pat. No. 5,252,652, had a very large gradient, almost 65 percent, from edge to center.

Blends of Organosulfur and Inorganic Sulfide Compounds

A core according to the present invention was created employing a blend of organosulfur and inorganic sulfide compounds as the cis-to-trans conversion catalyst (Example 31). The resultant core properties clearly demonstrate the advantages of a golf ball core made according to the current invention as compared to example cores constructed with conventional technology. The components and physical characteristics are presented in Table 8.

The compressive load is approximately half of the compressive load of three cores constructed in accordance with U.S. Pat. Nos. 5,697,856, 5,252,652, and 4,692,497, while at the same time retaining roughly the same, and in some cases a higher COR (resilience). Example 31 is soft, yet resilient (fast). The compressive load of the invention is greater than a fourth core constructed in accordance with U.S. Pat. No. 3,239,228, but has a significantly higher COR. The core constructed in accordance with U.S. Pat. No. 3,239,228 is very soft and very slow (low COR).

The percent change in dynamic stiffness from 0° C. to −50° C. was also measured at both the edge and center of the cores. The dynamic stiffness at both the edge and the center of Example 31 varied only slightly, less than 121 percent, over the temperature range investigated. The core made in accordance with U.S. Pat. No. 3,239,228 varied over 230 percent, whereas the cores made according to other conventional technology had a dynamic stiffness that varied by greater than 130 percent, and typically by as much as 150 percent, over the same temperature range.

The percent of trans-conversion was also measured at both the center and edge of the core prepared according to the current invention, and for cores prepared to the same four patents mentioned above, allowing a trans-gradient to be calculated. Example 31 had a trans-gradient that about 44 percent from edge to center. For the core prepared according to the current invention, the pre- and post-cure trans-percentages was also measured to determine the effectiveness of that process. The percentage of polybutadiene converted to the trans-isomer ranged from almost 26 percent at the center to greater than 45 percent at the edge. Two of the cores prepared in accordance with U.S. Pat. Nos. 3,239,228 and 4,692,497 had a zero trans-gradient. A third core prepared in accordance with U.S. Pat. No. 5,697,856 had only a slight trans-gradient, less than 18 percent from edge to center. A fourth core, prepared in accordance with U.S. Pat. No. 5,252,652 had a very large gradient, almost 65 percent from edge to center.

TABLE 8

Cores With Organosulfur and Inorganic Sulfide Compounds

| | Invention | | | Prior Art | | | |
|---|---|---|---|---|---|---|---|
| | | | | U.S. Pat. No. | U.S. Pat. No. 5816944 U.S. Pat. No. | U.S. Pat. No. | U.S. Pat. No. 4971329 U.S. Pat. No. |
| Chemical Constituents | 29 | 30 | 31 | 3239228 | 5697856 | 5252652 | 4692497 |
| Polybutadiene (Shell, CARIFLEX BR1220) | 100 | 100 | 100 | | N/A | N/A | N/A |
| Polybutadiene (Firestone, 35 NF) | | | | 100 | N/A | N/A | N/A |
| DMDS | | | | 2.1 | N/A | N/A | N/A |
| Carbon Black (RA) | | | | 15 | N/A | N/A | N/A |
| Wood Flour | | | | 24 | N/A | N/A | N/A |
| Sulfur | | | | 24 | N/A | N/A | N/A |
| Stearic Acid | | | | 1.5 | N/A | N/A | N/A |
| Reogen | | | | 15 | N/A | N/A | N/A |
| Vanox MBPC | | | | 2 | N/A | N/A | N/A |
| Triethanolamine | | | | 4 | N/A | N/A | N/A |
| Zinc oxide | 5 | 5 | 5 | 5 | N/A | N/A | N/A |
| Dicumyl peroxide | 3 | 1.9 | 2 | | N/A | N/A | N/A |
| Zinc Diacrylate | 25 | 25 | 25 | | N/A | N/A | N/A |
| Cis-to-Trans Catalyst | | | | | N/A | N/A | N/A |
| MnS | | 0.82 | | | N/A | N/A | N/A |
| Ditolyldisulfide | 2.5 | | 1.5 | | N/A | N/A | N/A |
| $Cu_2S$ | | | 1 | | N/A | N/A | N/A |
| Resultant Core Properties | | | | | | | |
| Load(lbs) @ 10.8% Deflection 1.580" core | 165.5 | 191.4 | 191.8 | 61.1 | 325 | 390 | 480 |
| Coefficient of Restitution @ 125 ft/s | 0.783 | 0.777 | 0.785 | 0.599 | 0.779 | 0.805 | 0.775 |
| Hardness Shore C | | | | | | | |
| Surface | 61 | 76 | 62 | 35 | 75 | 80 | 80.5 |
| Center | 52 | 52 | 59 | 30 | 70 | 61 | 66.5 |
| Dynamic Stiffness @ 0° C. (N/m) | | | | | | | |
| Edge* | 25338 | 27676 | 28493 | 8312 | 62757 | 83032 | 72235 |
| Center | 20783 | 17390 | 27579 | 8361 | 61071 | 26264 | 50612 |
| Dynamic Stiffness @ −50° C. (N/m) | | | | | | | |
| Edge* | 30265 | 34523 | 34455 | 19394 | 92763 | 109053 | 108242 |
| Center | 23022 | 20603 | 32195 | 18617 | 89677 | 28808 | 83183 |
| Dynamic Stiffness Ratio at −50° C./0° C. | | | | | | | |
| Edge* | 119% | 125% | 121% | 233% | 148% | 131% | 150% |
| Center | 111% | 118% | 117% | 223% | 147% | 110% | 164% |
| Loss Tangent 0° C. | | | | | | | |
| Edge* | 0.024 | 0.027 | 0.024 | 0.074 | 0.039 | 0.037 | 0.045 |
| Center | 0.025 | 0.023 | 0.023 | 0.073 | 0.033 | 0.025 | 0.043 |
| Loss Tangent −50° C. | | | | | | | |
| Edge* | 0.098 | 0.084 | 0.097 | 0.183 | 0.142 | 0.119 | 0.099 |
| Center | 0.067 | 0.071 | 0.085 | 0.180 | 0.129 | 0.059 | 0.095 |
| % Trans BR isomer Precure | 1.5 | 1.5 | 1.5 | 50 | N/A | N/A | N/A |
| % Trans BR isomer Postcure | | | | | | | |
| Surface | 55.8 | 8.4 | 45.5 | 50 | 30.2 | 24.6 | 1.5 |
| Center | 37.8 | 4.6 | 25.5 | 50 | 24.7 | 8.5 | 1.5 |
| % Trans Variation (Surf−Center)/Surf. | 32% | 45% | 44% | 0% | 18% | 65% | 0% |

*Edge is measured approximately 5 mm from the exterior surface of the measured article

Example 32

Golf Ball with Polybutadiene Core and MDI Polyurethane Cover

A dual core golf ball according to the present invention was created having a solid center, an intermediate layer surrounding the solid center, and a multilayer cover disposed concentrically around the intermediate layer (Example 32). The components and physical characteristics are presented below in Table 9.

TABLE 9

Golf Ball With Polybutadiene Core and MDI Polyurethane Cover

|  | Example 32 |
|---|---|
| Center Composition | |
| CARIFLEX BR1220 | 100 |
| zinc diacrylate | 20 |
| dicumyl peroxide | 2.5 |
| zinc oxide | 39 |
| DTDS | 0.75 |
| Center Properties | |
| % trans Precure | 1.5 |
| % trans Postcure | 40 |
| load in lbs required (10.8% deflection) | 109 |
| Intermediate Layer Composition | |
| CB23 | 80 |
| zinc diacrylate | 38 |
| VAROX 231 XL | 0.42 |
| DBDB-60 | 0.15 |
| zinc oxide | 6 |
| Polyisoprene | 20 |
| Inner Cover Composition and Properties | |
| Na SURLYN | 50 |
| Li SURLYN | 50 |
| Shore D hardness | 68 |
| Thickness | 0.03 in |

TABLE 9-continued

Golf Ball With Polybutadiene Core and MDI Polyurethane Cover

|  | Example 32 |
|---|---|
| Outer Cover Composition and Properties | |
| MDI polyurethane | |
| Thickness | 0.03 in |

A solid center was constructed for the ball of the present invention. The center was created from CARIFLEX BR-1220 polybutadiene as the starting material, the only difference being replacing the VAROX 802-40KE-HP peroxide (conventional technology) with a DTDS cis-to-trans catalyst of the current invention and dicumyl peroxide. This substitution allows a portion of the polybutadiene material to be converted to the trans-configuration during the molding process. The resulting solid center had an outside diameter of approximately 1.15 inches. The polybutadiene reaction product prepared thereby had a trans-isomer content of 40 percent compared to the 1.5 percent trans-isomer of conventional balls. An intermediate layer, having outside diameter of approximately 1.56 inches, was constructed around the solid center to form a core. The outer layer is made of CB23 having a molecular weight of about 360,000 and a Mooney viscosity of about 51.

Examples 33–35

Cores with Halogenated Organosulfur Compound

Three solid cores, each having an outer diameter of 1.58 inches, were formed of a composition comprising polybutadiene rubber, zinc diacrylate, zinc oxide, dicumyl peroxide, barium sulfate, and color dispersion. One core, representative of conventional technology, was used as a control (Example 33). The two remaining cores were each additionally blended with 5.3 parts Struktol® (Example 34) and the zinc salt of pentachlorothiophenol ("PCTP") at 2.4 parts (Example 35). Struktol® at 5.3 parts contains 2.4 parts PCTP. The specific compositions for each of the solid cores are presented below in Table 10.

TABLE 10

Cores With Halogenated Organosulfur Compound

| INGREDIENT | Example 33 (Control) | | | Example 34 | | | Example 35 | | | |
|---|---|---|---|---|---|---|---|---|---|---|
| Polybutadiene rubber | 100 | 100 | 100 | 100 | 100 | 100 | 100 | 100 | 100 | 100 |
| zinc diacrylate | 18 | 25 | 30 | 27 | 34 | 41 | 20 | 25 | 30 | 35 |
| Dicumyl peroxide | 0.5 | 0.5 | 0.5 | 1.8 | 1.8 | 1.8 | 0.8 | 0.8 | 0.8 | 0.8 |
| Struktol ® A95 | — | — | — | 5.3 | 5.3 | 5.3 | — | — | — | — |
| zinc salt of PCTP | — | — | — | — | — | — | 2.4 | 2.4 | 2.4 | 2.4 |
| zinc oxide | 26.5 | 24.1 | 22.2 | 5 | 5 | 5 | 5 | 5 | 5 | 5 |
| Barium sulfate | — | — | — | 16.2 | 13.4 | 10.6 | 21.7 | 19.7 | 17.7 | 15.7 |
| color dispersion | 0.14 | 0.14 | 0.14 | 0.14 | 0.14 | 0.14 | 0.14 | 0.14 | 0.14 | 0.14 |
| PROPERTY | | | | | | | | | | |
| Effective Modulus (psi) | 3800 | 6200 | 8700 | 4100 | 6200 | 7700 | 3600 | 5100 | 7400 | 9700 |

TABLE 10-continued

Cores With Halogenated Organosulfur Compound

| INGREDIENT | Example 33 (Control) | | | Example 34 | | | Example 35 | | |
|---|---|---|---|---|---|---|---|---|---|
| Atti Compression | 17 | 52 | 76 | 22 | 52 | 67 | 13 | 38 | 65 | 84 |
| COR @ 125 ft/s | 0.764 | 0.789 | 0.802 | 0.773 | 0.794 | 0.802 | 0.782 | 0.801 | 0.813 | 0.823 |

The addition of PCTP, in either form, increases COR, decreases compression, or both. In particular, the PCTP zinc salt (Example 35) provides comparable COR's with lower compression and/or increased COR's with comparable (or lower) compression, both of which are desirable golf ball properties.

Examples 36–38

Uncrosslinked Intermediate Layer Materials According to the Invention

A flex bar specimen having the dimensions 3/16"×1/2"×4" was produced by compression molding uncrosslinked intermediate layer material of Cariflex BR-1220 polybutadiene rubber with trans-polyisoprene according to the invention. The flexural modulus of uncrosslinked intermediate layers prepared according to the invention was measured using ASTM Method D790M-93, Method II, with a loading rate of 0.5 in/min. The results are shown in Table 11.

Sufficient reinforcing polymer component was present in these examples to form a flex bar for testing and to help reduce or prevent eccentricity during processing and in the resultant golf balls prepared according to the invention.

TABLE 11

Uncrosslinked Intermediate Layer Materials According to the Invention

| Example # | Reinforcing Component Amount* | Flexural Modulus (MPa) |
|---|---|---|
| 36 | 13.1% | 7.6 |
| 37 | 19.8% | 13 |
| 38 | 26.6% | 21.5 |

*The Reinforcing Polymer Component Amount is a percentage based on the total weight of the resilient and reinforcing polymer components

Examples 38–40

Improved Centering According to the Invention

Three types of golf balls were tested after cure to determine the degree of accuracy in concentricity. Measured values, shown in Table 12, include the average shift, maximum shift, and minimum shift, of the intermediate layer from the midpoint of the ball. The standard deviation ("STD") was also calculated.

Example 38 was a competitor's core prepared with conventional materials, which resulted in a typically off-center ball. Examples 39–40 were prepared using the materials and methods of the present invention, and clearly resulted in a highly improved concentricity.

TABLE 12

Improved Centering

| Example # | Avg. Shift (inches) | STD | Max Shift (inches) | Min. Shift (inches) |
|---|---|---|---|---|
| 38 (Conventional) | 0.035 | 0.023 | 0.125 | 0.009 |
| 39 | 0.014 | 0.011 | 0.052 | 0.001 |
| 40 | 0.015 | 0.02 | 0.065 | 0.001 |

Examples 41–46

Cores with Low Levels of Antioxidant

As stated previously, conventional golf ball core materials have antioxidants in them. Examples of conventional core compositions are described in Australian Patent No. 703,884 to Yokota et al. and U.S. Pat. No. 5,697,856 to Moriyama et al. To illustrate one aspect of the present invention, golf balls were prepared according to comparative example 5 of Moriyama, and Examples 1, and 2 of Yokota and compared to golf ball cores made according to the present invention. The results of the comparison of these golf balls with the present invention are shown in Table 13.

Because the butadiene rubbers disclosed in Yokota and Moriyama (BR-01) are not sold domestically, Butadiene rubber grade CB23, manufactured by Bayer, was substituted for the butadiene rubber grades used in Moriyama and Yokota. Bayer CB-23 was selected as a suitable substitute based on information provided in The Synthetic Rubber Manual (14$^{th}$ ed. 1999), which is a widely recognized standard reference for the worldwide synthetic rubber industry.

Cores were made according to the invention (Examples 44–46) with substantially no antioxidant using a reaction product of polybutadiene rubber (CB23), peroxide (DCP-70), cis-to-trans catalyst diphenyl disulfide (DPDS), crosslinking agent zinc diacrylate (ZDA), antioxidant, and filler zinc oxide vulcanized at 302° F. for 25 minutes. The same cores were prepared with a conventional amount of antioxidant (Examples 41–43). In particular, Table 13 demonstrates that when the reaction product is substantially free of antioxidant, the percent of trans-isomer post-cure is substantially higher than the amount of trans-isomer post-cure when antioxidant is included in the formulation.

TABLE 13

Cores of the Invention vs. Cores with Antioxidant

| | Prior Art | | | | | | | | |
|---|---|---|---|---|---|---|---|---|---|
| Chemical Constituents | Example 41 | | | Example 42 | | | Example 43 | | |
| Polybutadiene (Bayer CB23) | 100.00 | | | 100.00 | | | 100.00 | | |
| Diphenyl Disulfide (DPDS) | 0.50 | | | 2.00 | | | 0.50 | | |
| Dicumyl peroxide (DCP-70) | 1.14 | | | 1.14 | | | 1.14 | | |
| Zinc Diacrylate (ZDA) | 26.00 | | | 28.00 | | | 29.00 | | |
| Zinc Oxide | 30.00 | | | 29.00 | | | 20.00 | | |
| Antioxidant | 0.50 | | | 0.50 | | | 0.50 | | |
| Resultant Core Properties | | | | | | | | | |
| Specific Gravity | 1.19 | | | 1.19 | | | 1.13 | | |
| % Trans BR isomer Precure | 3% | | | 3% | | | 3% | | |
| % Trans BR isomer Postcure | 335° F. × 11 m. | 302° F. × 25 m. | 293° F. × 40 m. | 335° F. × 11 m. | 302° F. × 25 m. | 293° F. × 40 m | 335° F. × 11 m. | 302° F. × 25 m. | 293° F. × 40 m. |
| Surface | 18% | 8% | 12% | 28% | 19% | 24% | 15% | 11% | 9% |
| Center | 11% | 15% | 19% | 9% | 32% | 37% | 12% | 16% | 19% |
| % Hardness Variation (Surf.–Center)/Surf. | 8.1% | 16.6% | 21.0% | 25.6% | 29.4% | 28.5% | 11% | 24.1% | 22.0% |

| | Invention (Substantially Free of Antioxidant) | | | | | | | | |
|---|---|---|---|---|---|---|---|---|---|
| Chemical Constituents | Example 44 | | | Example 45 | | | Example 46 | | |
| Polybutadiene (Bayer CB23) | 100.00 | | | 100.00 | | | 100.00 | | |
| Diphenyl Disulfide (DPDS) | 0.50 | | | 2.00 | | | 0.50 | | |
| Dicumyl peroxide (DCP-70) | 1.14 | | | 1.14 | | | 1.14 | | |
| Zinc Diacrylate (ZDA) | 26.00 | | | 28.00 | | | 29.00 | | |
| Zinc Oxide | 30.00 | | | 29.00 | | | 20.00 | | |
| Antioxidant | — | | | — | | | — | | |
| Resultant Core Properties | | | | | | | | | |
| Specific Gravity | 1.18 | | | 1.18 | | | 1.13 | | |
| % Trans BR isomer Precure | 3% | | | 3% | | | 3% | | |
| % Trans BR isomer Postcure | 335° F. × 11 m. | 302° F. × 25 m. | 293° F. × 40 m. | 335° F. × 11 m. | 302° F. × 25 m. | 293° F. × 40 m. | 335° F. × 11 m. | 302° F. × 25 m. | 293° F. × 40 m. |
| Surface | 31% | 30% | 32% | 50% | 40% | 42% | 32% | 26% | 30% |
| Center | 12% | 17% | 22% | 23% | 40% | 45% | 11% | 13% | 19% |
| % Hardness Variation (Surf.–Center)/Surf. | 29.1% | 6.9% | 5.2% | 15.8% | 9.2% | 7.1% | 33.1% | 9.3% | 2.9% |

The invention described and claimed herein is not to be limited in scope by the specific embodiments herein disclosed, since these embodiments are intended as illustrations of several aspects of the invention. Any equivalent embodiments are intended to be within the scope of this invention. For example, the halogenated organosulfur polymers of the present invention may also be used in golf equipment, in particular, inserts for golf clubs, such as putters, irons, and woods, and in golf shoes and components thereof. Indeed, various modifications of the invention in addition to those shown and described herein will become apparent to those skilled in the art from the foregoing description. Such modifications are also intended to fall within the scope of the appended claims.

What is claimed is:

1. A golf ball having a cover and a core, wherein the core comprises a material formed from the conversion reaction of polybutadiene, a free radical source comprising a single peroxide, and a cis-to-trans catalyst comprising zinc pentachlorothiophenol, wherein the conversion reaction occurs at a sufficient temperature to form a polybutadiene reaction product comprising:

a second amount of trans-isomer content greater than the first amount of trans-isomer content, wherein the material has a free radical source to antioxidant ratio of about 25 or greater, wherein the cis-to-trans catalyst is present in an amount of about 2.2 parts per hundred or greater, and wherein a first hardness measured at an interior location in the core differs from a second hardness measured at an exterior surface on the core by at least about 10 percent wherein the golf ball has a coefficient of restitution of about 0.81 or greater.

2. The golf ball of claim 1, wherein the free radical source to antioxidant ratio is about 50 or greater.

3. The golf ball of claim 2, wherein the free radical source to antioxidant ratio is about 100 or greater.

4. The golf ball of claim 3, wherein the free radical source to antioxidant ratio is about 200 or greater.

5. The golf ball of claim 4, wherein the free radical source to antioxidant ratio is about 300 or greater.

6. The golf ball of claim 1, wherein the cover comprises at least one of a vinyl resin, a polyolefin, a polyurethane, a polyurea, a polyamide, an acrylic resin, a polyphenylene oxide resin, a thermoplastic polyester, a thermoplastic rubber, a fully-neutralized polymer, a partially-neutralized polymer, or a mixture thereof.

7. The golf ball of claim 6, wherein the cover is formed of a polyurethane composition comprising a prepolymer formed of a polyisocyanate and a polyol, and a curing agent.

8. The golf ball of claim 7, wherein at least one of the prepolymer and curing agent are saturated.

9. The golf ball of claim 1, wherein the material is substantially free of antioxidants.

10. The golf ball of claim 1, wherein the free radical source is present in an amount of about 3 parts per hundred or less of the material and the antioxidant is present in an amount of about 0.1 parts per hundred or less of the material.

11. The golf ball of claim 1, wherein a ratio of the free radical source to the cis-to-trans catalyst is about 1 or less.

12. The golf ball of claim 1, wherein a ratio of the free radical source to the cis-to-trans catalyst is greater than about 1.

13. The golf ball of claim 9, wherein the material comprises less than about 0.05 parts per hundred or less of antioxidants.

14. A golf ball having a cover and a core,
wherein the core comprises a material formed from the conversion reaction of polybutadiene, a free radical source comprising a single peroxide, and a cis-to-trans catalyst comprising zinc pentachlorothiophenol present in an amount of about 2.2 parts per hundred or greater, wherein the conversion reaction occurs at a sufficient temperature to form a polybutadiene reaction product comprising a second amount of trans-isomer content greater than the first amount of trans-isomer content, wherein the material has a free radical source to antioxidant ratio of about 25 or greater, wherein the reaction product has a first hardness measured at an interior location in the core that differs from a second hardness measured at an exterior surface on the core by at least about 10 percents wherein the cover comprises an inner cover and an outer cover, wherein at least one of the inner and outer cover has a thickness of 0.02 to 0.04 inches, and wherein the golf ball has a coefficient of restitution of about 0.81 or greater.

15. The golf ball of claim 14, wherein the free radical source to antioxidant ratio is about 100 or greater.

16. The golf ball of claim 15, wherein the material is substantially free of antioxidants.

17. The golf ball of claim 14, wherein the second amount of trans-isomer content is about 10 percent or greater.

18. The golf ball of claim 17, wherein the second amount of trans-isomer is about 20 percent or greater.

19. The golf ball of claim 14, wherein the cis-to-trans catalyst is present in an amount of about 2.3 parts per hundred to about 5 parts per hundred.

20. The golf ball of claim 16, wherein the material comprises less than about 0.01 parts per hundred or less of antioxidants.

21. The golf ball of claim 14, wherein the cover comprises polyurethane.

* * * * *